United States Patent
Koyabu et al.

(10) Patent No.: US 8,483,494 B2
(45) Date of Patent: Jul. 9, 2013

(54) IMAGE ENCODING DEVICE AND IMAGE ENCODING METHOD

(75) Inventors: Kyohei Koyabu, Kanagawa (JP); Takaaki Fuchie, Kanagawa (JP)

(73) Assignee: Sony Corporation, Tokyo (JP)

( * ) Notice: Subject to any disclaimer, the term of this patent is extended or adjusted under 35 U.S.C. 154(b) by 294 days.

(21) Appl. No.: 12/840,739

(22) Filed: Jul. 21, 2010

(65) Prior Publication Data

US 2011/0019930 A1 Jan. 27, 2011

(30) Foreign Application Priority Data

Jul. 27, 2009 (JP) ................................ P2009-173907

(51) Int. Cl.
*G06K 9/46* (2006.01)
*G06K 9/36* (2006.01)

(52) U.S. Cl.
USPC .......................................... 382/238; 382/236

(58) Field of Classification Search
USPC .................. 382/232–233, 237–239, 250–253
See application file for complete search history.

(56) References Cited

U.S. PATENT DOCUMENTS

| | | | |
|---|---|---|---|
| 5,870,145 A | 2/1999 | Yada et al. | |
| 6,163,573 A | 12/2000 | Mihara | |
| 7,796,825 B2 * | 9/2010 | Chen et al. | 382/232 |
| 2003/0154687 A1 * | 8/2003 | Sugahara et al. | 52/750 |
| 2006/0256853 A1 * | 11/2006 | Schlockermann et al. | 375/240.03 |
| 2008/0089410 A1 * | 4/2008 | Lu et al. | 375/240.03 |
| 2010/0098173 A1 | 4/2010 | Horiuchi et al. | |

FOREIGN PATENT DOCUMENTS

| | | |
|---|---|---|
| EP | 0 655 868 | 5/1995 |
| EP | 2 061 253 | 5/2009 |
| GB | 2 347 039 | 8/2000 |
| WO | WO 96 28937 | 9/1996 |
| WO | WO 2008 104566 | 9/2008 |
| WO | WO 2009 035149 | 3/2009 |

OTHER PUBLICATIONS

Chen Y et al: "Extracting coding parameters from pre-coded MPEG-2 video" Image Processing, 1998. ICIP 98. Proceedings. 1998 International Conference on Chicago, IL, USA Oct. 4-7, 1998, Los Alamitos, CA, USA,IEEE Comput. Soc, US Linkd-DOI:10. 1109/ICIP.1998.723381, vol. 2, Oct. 4, 1998, pp. 360-364, XP010308516 ISBN: 978-0-8186-8821-8.

* cited by examiner

*Primary Examiner* — Bernard Krasnic
*Assistant Examiner* — Weiwen Yang
(74) *Attorney, Agent, or Firm* — Frommer Lawrence & Haug LLP; William S. Frommer

(57) ABSTRACT

An image encoding device includes: a first encoding unit for calculating a generated code amount by encoding image data for each GOP (Group of Picture); a code amount control unit for setting quantization information for realizing a target generated code amount based on the generated code amount; a quantization information distinguishing unit for calculating a DCT (Discrete Cosine Transform) coefficient, and distinguishing quantization information that minimizes the summation for each picture of remainders when performing division of the DCT coefficient, as quantization information used for performing the last encoding; a picture-type setting unit for setting a picture type to the image data for each GOP, and when this set picture type differs from the picture type of the distinguished quantization information, matching the picture types by controlling the settings of the subsequent picture types; and a second encoding unit for encoding the image data based on the set picture type.

7 Claims, 23 Drawing Sheets

FIG. 13A
QMF

| 16 | 16 | 16 | 16 |
|----|----|----|----|
| 16 | 16 | 16 | 16 |
| 16 | 16 | 16 | 16 |
| 16 | 16 | 16 | 16 |

FIG. 13B
QMN

| 16 | 20 | 28 | 48 |
|----|----|----|----|
| 20 | 28 | 48 | 72 |
| 28 | 48 | 72 | 84 |
| 48 | 72 | 84 | 96 |

FIG. 13C
QMS

| 16  | 42  | 116 | 128 |
|-----|-----|-----|-----|
| 42  | 116 | 128 | 140 |
| 116 | 128 | 140 | 170 |
| 128 | 140 | 170 | 255 |

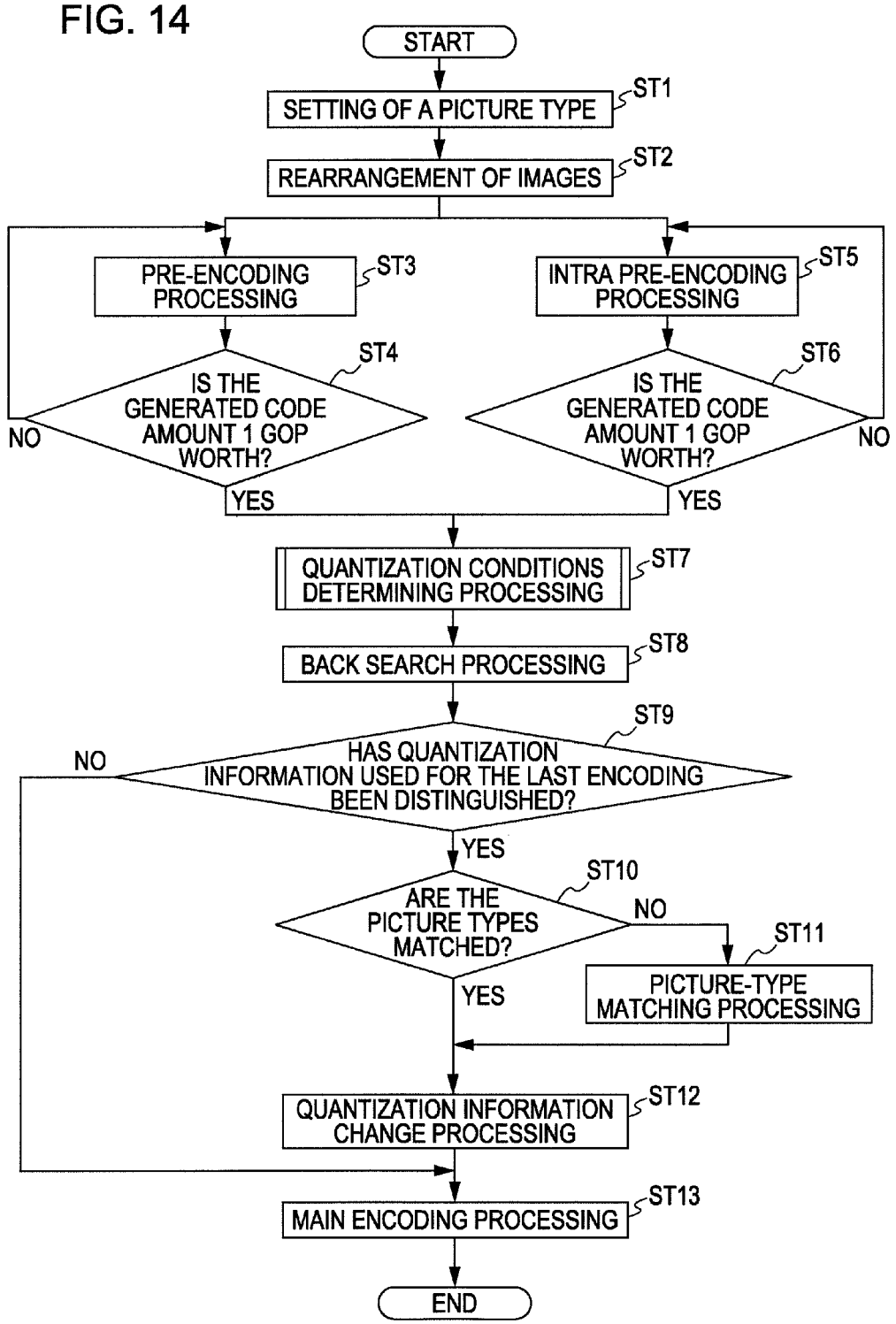

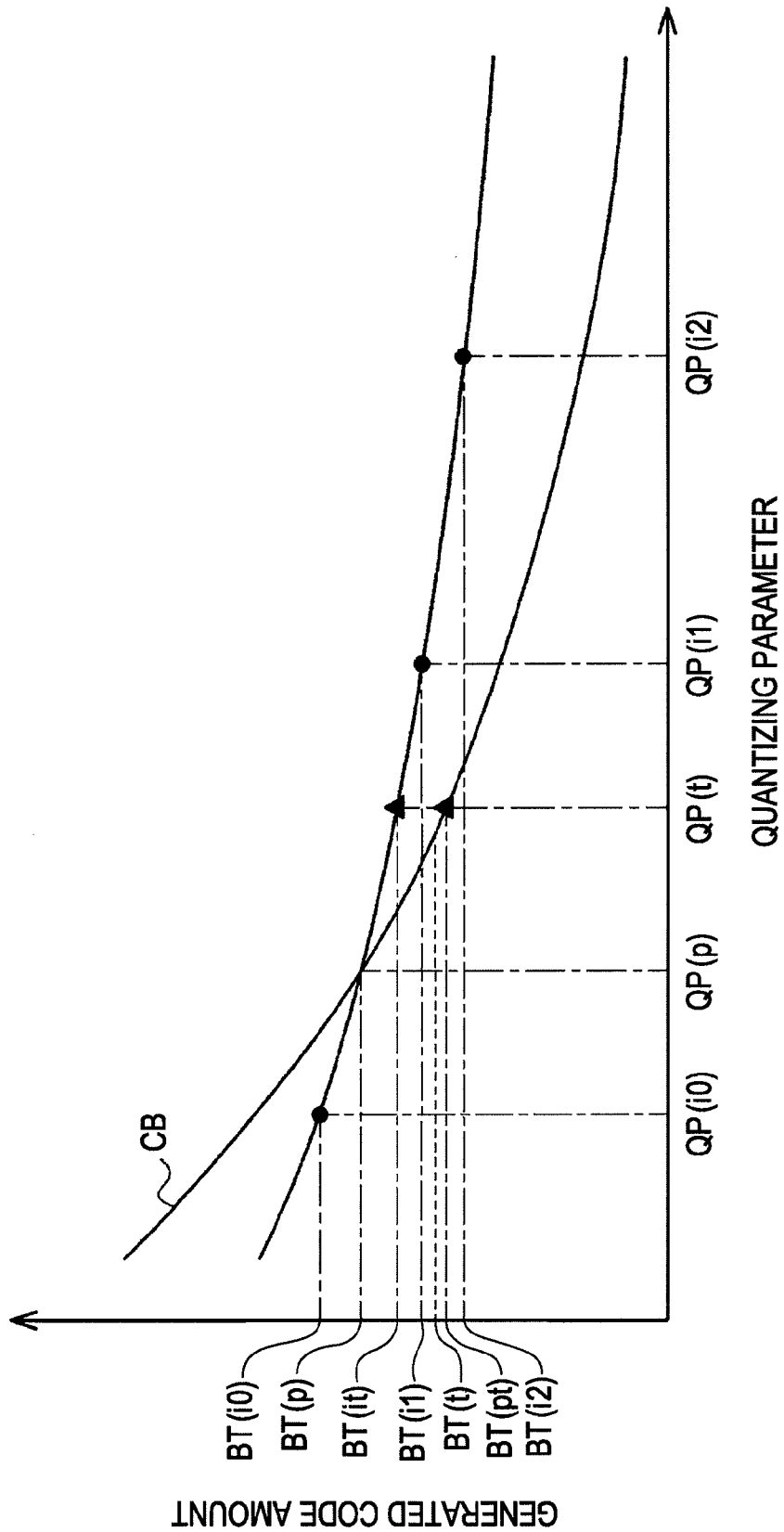

IMAGE ENCODING DEVICE AND IMAGE ENCODING METHOD

BACKGROUND OF THE INVENTION

1. Field of the Invention

The present invention relates to an image encoding device, and an image encoding method, and more specifically, it relates to an image encoding device, and an image encoding method, whereby deterioration in image quality can be reduced even when repeating encoding and decoding of an image by employing a long GOP configuration.

2. Description of the Related Art

Hitherto, with an image encoding method such as MPEG2 (Moving Picture Experts Group 2) or the like, it is a great problem to maintain subjective image quality to ideally distribute a code amount.

For example, an ideal code amount distribution of a still image is a state in which distortion is uniformly encoded (with a fixed quantized scale). When reaching a code amount whereby this distortion becomes great, subjective image quality can be enhanced by biasing the distortion toward a high-frequency component or complicated portion.

Now, for example, with International Publication WO96/28937, an image signal encoding method has been disclosed wherein the image quality of a decoded image can be improved by employing code amount control according to a feed forward method to enable control adapted to the local property of an image quality signal. The feed forward method is for determining a suitable quantizing scale in a range where a generated code amount does not exceed a target generated code amount by calculating a code amount to be generated in increments of equal lengthening regarding a plurality of quantizing scales.

On the other hand, with code amount control such as TM5 proposed as a test model with MPEG2, or the like, code amount control is performed by performing feedback control using relationship between the remaining amount of a virtual buffer, a quantization index at the time of previous encoding, and a generated code amount.

Also, in order to suppress deterioration in image quality at the time of repeating encoding and decoding of an image, for example, with International Publication WO2009/035144, the quantizing parameter and quantizing matrix used at the last encoding are detected.

SUMMARY OF THE INVENTION

Incidentally, with image editing processing or the like, streams when encoding image data in increments of GOP (Group of Picture) including reference pictures and non-reference pictures in a predetermined order, encoded streams of a long GOP configuration are employed. Note that the reference pictures are an I picture (Intra encoded image) and a P picture (Predictive encoded image). Also, the non-reference picture is a B picture (Bidirectionally Predictive encoded image).

In the case of using encoded streams of such a long GOP configuration to perform editing processing or the like, various types of processing, e.g., color collection, cut editing, or the like is performed as to image data obtained by decoding the encoded streams. Also, the image data after editing is encoded again to generate encoded streams. Thus, in the event of encoding and decoding being repeated, when the picture type differs from the last encoding, deterioration in image quality may become marked as compared to a case where the picture types are the same. For example, in the event of performing encoding so as to suppress deterioration in image quality of a reference picture by assigning great code amount to a reference picture to be referred from another picture, deterioration in image quality of the entire image can be reduced. Thus, when improving subjective image quality by providing image quality difference between a reference picture and a non-reference picture, in the event of a non-reference picture of which the image quality is inferior to the image quality of a reference picture being set to a reference picture at the next encoding, deterioration in image quality of the entire image increases.

Accordingly, it has been found to be desirable to provide an image encoding device and an image encoding method whereby deterioration in image quality can be reduced even when encoding and decoding of image data is repeated by employing a GOP configuration including reference pictures and non-reference pictures in a predetermined order.

An embodiment of the present invention is an image encoding device including: a first encoding unit configured to calculate a generated code amount by performing encoding of image data in increments of GOPs (Group of Picture) including a reference picture and a non-reference picture in a predetermined order using predetermined quantization information; a code amount control unit configured to perform setting of quantization information for realizing a target generated code amount based on the generated code amount calculated at the first encoding unit; a quantization information distinguishing unit configured to perform calculation of a DCT (Discrete Cosine Transform) coefficient with the image of each frame of the image data as an I picture (Intra encoded image) that is a reference picture, and to distinguish quantization information that minimizes the summation of remainders, in increments of pictures, at the time of performing division of the DCT coefficient using the quantization information in a range with the quantization information determined by the code amount control unit as a reference, as quantization information used at the time of performing the last encoding; a picture-type setting unit configured to perform the setting of a picture type as to the image data in increments of the GOP, and in the case of this set picture type is different from a picture type of which the quantization information has been distinguished at the quantization information distinguishing unit, to match the picture types by controlling the settings of the subsequent picture types; and a second encoding unit configured to perform encoding of the image data based on the picture type set at the picture-type setting unit using the quantization information set at the code amount control unit.

Also, another embodiment of the present invention is an image encoding method including the steps of: calculating, with a first encoding unit, of a generated code amount by performing encoding of image data in increments of GOPs (Group of Picture) including a reference picture and a non-reference picture in a predetermined order using predetermined quantization information; setting, with a code amount control unit, of quantization information for realizing a target generated code amount based on the generated code amount calculated at the first encoding unit; calculating, with a quantization information distinguishing unit of a DCT (Discrete Cosine Transform) coefficient with the image of each frame of the image data as an I picture (Intra encoded image) that is a reference picture, and distinguishing of quantization information that minimizes the summation of remainders, in increments of pictures, at the time of performing division of the DCT coefficient using the quantization information in a range with the quantization information determined by the code amount control unit as a reference, as quantization information used at the time of performing the last encoding; setting, with a picture-type setting unit, of a picture type as to the image data in increments of the GOP, and in the case of this set picture type is different from a picture type of which the quantization information has been distinguished at the quantization information distinguishing unit, matching the picture types by controlling the settings of the subsequent picture types; and encoding, with a second encoding unit, of the image data based on the picture type set at the picture-type setting unit using the quantization information set at the code amount control unit.

With the above configurations, a long GOP configuration is employed, pre-encoding of image data is performed at the first encoding unit, and main encoding is performed at the second encoding unit. With the first encoding unit, encoding is performed using predetermined quantization information to calculate a generated code amount. With the code amount control unit, setting of quantization information is performed to realize a target generated code amount from relationship between the predetermined quantization information and the generated code amount.

With the quantization information distinguishing unit, calculation of a DCT coefficient is performed with the image of each frame of image data as an I picture, and quantization information that minimizes the summation of remainders, in increments of pictures, when performing division of the DCT coefficient using quantization information is distinguished to be the quantization information used at the time of performing the last encoding. Here, the quantization information to be used for distinction is quantization information of a range with the quantization information set at the code amount control unit as a reference, and accordingly, distinction does not have to be performed using all of the quantization information, and distinction of quantization information used at the time of performing the last encoding is facilitated.

With the picture-type setting unit, setting of a picture type is performed in increments of GOPs as to image data, and when the set picture type, and the picture type of which the quantization information has been distinguished at the quantization information distinguishing unit, differ, the picture types are matched by controlling the setting of the subsequent picture type. For example, the picture-type setting unit performs, at the time of the I picture distinguished at the quantization information distinguishing unit of which the phase advances as compared to the I picture to be set to the image data, adjustment of the length of GOP by reducing the number of pictures earlier than the I picture by the number of advancing pictures to match a picture type to be set to the image data, and a picture type at the time of performing the last encoding. Also, the picture-type setting unit performs, at the time of the I picture distinguished at the quantization information distinguishing unit of which the phase is lagging as compared to the I picture to be set to the image data, adjustment of the length of GOP by reducing the number of pictures of the next single or plurality of GOP to match the picture types of a reference picture and a non-reference picture to be set to the image data, and a picture type at the time of performing the last encoding. Such setting of a picture type is performed at the picture-type setting unit, and accordingly, the same picture type as that of the last encoding may be set to the image data.

With the second encoding unit, main encoding of image data is performed using the quantization information set at the code amount control unit, i.e., for example a quantizing parameter set by pre-encoding being performed. Also, when main encoding of image data of which the encoding had been performed last time is performed, encoding is performed at the second encoding unit with the picture type at the time of performing the last encoding. Further, the quantization information set at the code amount control unit is changed to the quantization information distinguished at the quantization information distinguishing unit by the quantization information determining unit, and with the second encoding unit, encoding of image data is performed using the quantization information at the time of performing the last encoding.

Further, when a third encoding unit is provided to calculate a generated code amount by performing encoding for each of the quantization information with the image of each frame of the image data as an I picture using a plurality of different quantization information, the code amount control unit performs prediction of quantization information that realizes a target generated code amount, and a generated code amount at the time of using this quantization information based on the generated code amount calculated at the first encoding unit, corrects the predicted generated code amount according to the generated code amount calculated at the third encoding unit, and performs setting of quantization information such that the generated code amount after correction realizes the target generated code amount. Thus, the quantization information realizing a target generated code amount can be distinguished with precision, and quantization information to be used for distinction of quantization information used at the time of performing the last encoding can accurately be selected.

According to the above configurations, a generated code amount is calculated by performing encoding of image data in increments of GOPs (Group of Picture) including a reference picture and a non-reference picture in a predetermined order using predetermined quantization information. Also, setting of quantization information for realizing a target generated code amount is performed based on the calculated generated code amount. Further, a DCT (Discrete Cosine Transform) coefficient is calculated with the image of each frame of the image data as an I picture (Intra encoded image). Also, division of the DCT coefficient is performed using the quantization information in a range with distinguished quantization information as a reference, quantization information that minimizes the summation of remainders, in increments of pictures, is distinguished to be the quantization information used at the time of performing the last encoding. Setting of a picture type is performed as to the image data in increments of the GOP, and in the case of this set picture type is different from a picture type with quantization information being distinguished at the time of performing the last encoding, settings of the subsequent picture types are controlled to match the picture types. Further, encoding of the image data is performed based on the picture type set using the distinguished quantization information.

Thus, deterioration in image quality can be reduced even when performing encoding and decoding of image data by employing a GOP configuration including a reference picture and a non-reference picture in a predetermined order.

BRIEF DESCRIPTION OF THE DRAWINGS

FIGS. 13A through 13C are diagrams exemplifying a quantizing matrix;

FIG. 14 is a flowchart illustrating the operation of the second embodiment;

FIG. 15 is a diagram for describing processing for calculating a quantizing parameter and a generated code amount;

DESCRIPTION OF THE PREFERRED EMBODIMENTS

Figure 1:
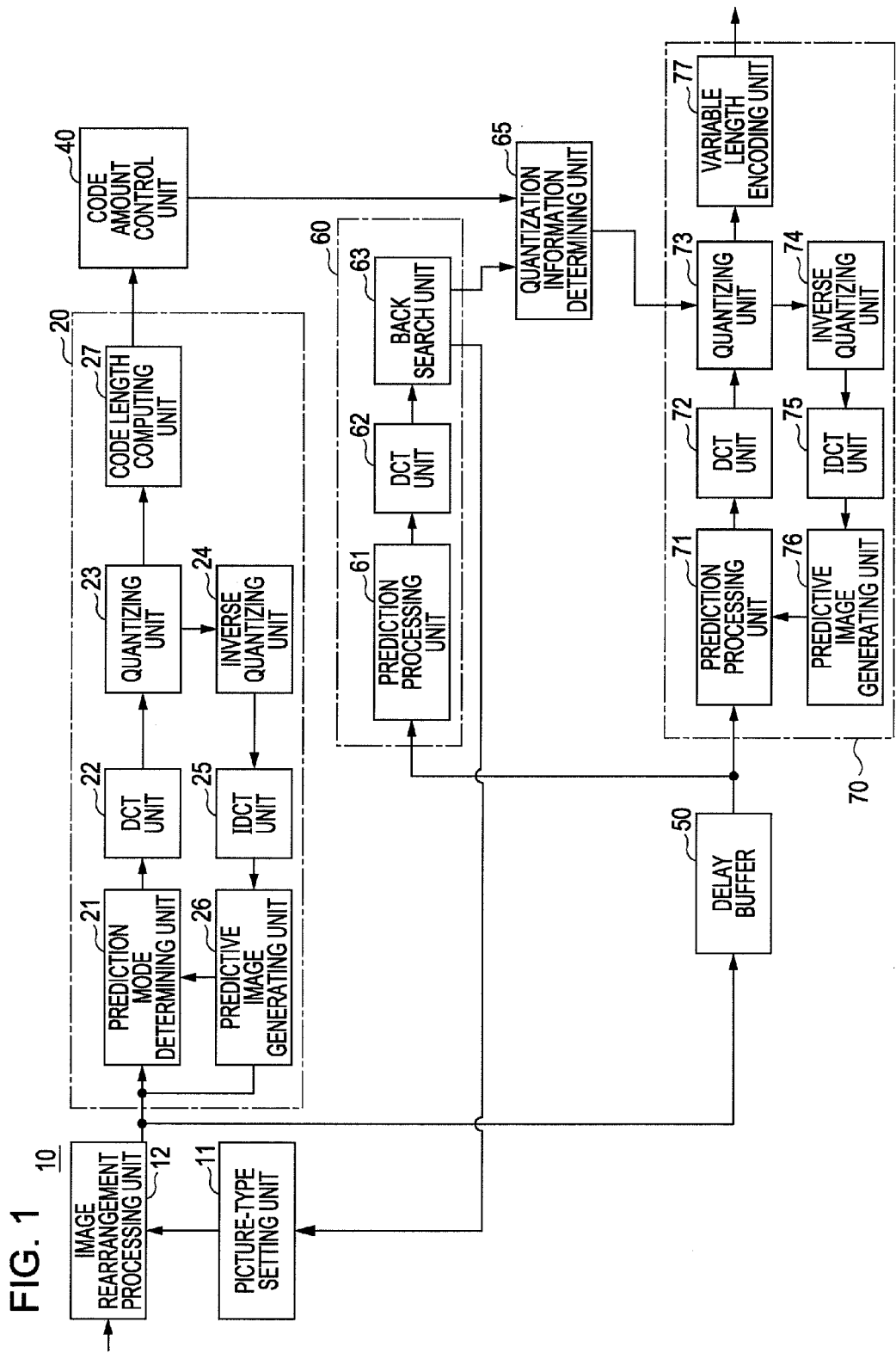
FIG. 1 is a diagram illustrating the configuration of a first embodiment.

Embodiments for implementing the present invention will be described below in accordance with the following sequence.
1. Configuration of First Embodiment
2. Operation of First Embodiment
3. Configuration of Second Embodiment
4. Operation of Second Embodiment
1. Configuration of First Embodiment FIG. 1 illustrates the configuration of a first embodiment of the present invention. An image encoding device 10 includes a picture-type setting unit 11, an image rearrangement processing unit 12, a pre-encoding unit 20 serving as a first encoding unit, a code amount control unit 40, a delay buffer 50, a quantization information distinguishing unit 60, a quantization information determining unit 65, and a main encoding unit 70 serving as a second encoding unit.

The pre-encoding unit 20 includes a prediction mode determining unit 21, a DCT (Discrete Cosine Transform) unit 22, a quantizing unit 23, an inverse quantizing unit 24, an IDCT (Inverse Discrete Cosine Transform) unit 25, a predictive image generating unit 26, and a code length computing unit 27. The quantization information distinguishing unit 60 includes a prediction processing unit 61, a DCT unit 62, and a back search unit 63. The main encoding unit 70 includes a prediction processing unit 71, a DCT unit 72, a quantizing unit 73, an inverse quantizing unit 74, an IDCT unit 75, a predictive image generating unit 76, and a variable length encoding unit 77.

With such a configuration, the picture-type setting unit 11 sets one picture type of an I picture (Intra encoded image) and a P picture (Predictive encoded image) that are reference images, and a B picture (Bidirectionally Predictive encoded image) that is a non-reference image to each frame of the image data of an input image in accordance with a long GOP configuration to notify this to the image rearrangement processing unit 12. Also, when the picture type of which the quantization information has been distinguished at the quantization information distinguishing unit 60 differs from the set picture type, the picture-type setting unit 11 matches the picture types by controlling the setting of the subsequent picture type based on the distinctive signal supplied from the later-described quantization information distinguishing unit 60.

The image rearrangement processing unit 12 rearranges the image data of the input image in the sequence of pictures from the display sequence to the encoding sequence in accordance with the picture type set at the picture-type setting unit 11. Subsequently, the image rearrangement processing unit 12 outputs the image data rearranged in the encoding sequence to the pre-encoding unit 20 and the delay buffer 50. Note that the image encoding device 10 can identify which picture type the image of each frame is set to. For example, information indicating a picture type is added to the image data rearranged, for example, in the encoding sequence. Also, the picture type may be identified by supplying information that can identify which picture type the image of each frame is, to the pre-encoding unit 20, main encoding unit 70, and the like from the picture-type setting unit 11 or image rearrangement processing unit 12.

The pre-encoding unit 20 performs calculation of a generated code amount when encoding of the image data has been performed using a fixed quantizing parameter, and outputs the calculated generated code amount to the code amount control unit 40. The prediction mode determining unit 21 of the pre-encoding unit 20 determines a prediction mode for each macro block using the image data of the input image, and the predictive image data generated at the later-described predictive image generating unit 26. Also, the prediction mode determining unit 21 uses the predictive image data of the determined prediction mode to output difference image data indicating error as to the image data of the input image to the DCT unit 22.

The DCT unit 22 performs discrete cosine transform as to the difference image data to generate a DCT coefficient, and outputs this to the quantizing unit 23.

The quantizing unit 23 performs quantization of the DCT coefficient using the predetermined quantization information, i.e., a fixed quantizing parameter QP(p), and outputs the generated quantized data to the inverse quantizing unit 24 and the code length computing unit 27.

The inverse quantizing unit 24 performs inverse quantization as to the quantized data to generate a DCT coefficient, and outputs this to the IDCT unit 25.

The IDCT unit 25 performs inverse discrete cosine transform of the DCT coefficient supplied from the inverse quantizing unit 24 to generate difference image data, and outputs this to the predictive image generating unit 26.

The predictive image generating unit 26 uses the difference image data to generate the image data of a local decoded image. Also, the predictive image generating unit 26 uses the image data of the input image to perform motion estimation between the current frame and the next temporally adjacent frame in increments of macro blocks. Further, the predictive image generating unit 26 performs motion compensation of the local decoded image based on the motion estimation result to generate predictive image data from the image data of the local decoded image, and outputs this to the prediction mode determining unit 21.

The code length computing unit 27 performs encoding as to the quantized data using either the Context-Adaptive Variable Length Coding (CAVLC) method or the Context-Adaptive Binary Arithmetic Coding (CABAC) method, calculates a generated code amount for each macro block, and outputs this to the code amount control unit 40.

The CAVLC method is a method simpler than the CABAC method, and the CABAC method is a method whereby data amount can be reduced as compared to the CAVLC method. Now, description will be made regarding a case where the variable length coding method is employed at the pre-encoding unit 20 for simplifying the processing, and the arithmetic coding method is employed at the main encoding unit 70 for reducing data amount. With the variable length coding, the information of a certain region is effectively encoded, and with the arithmetic coding, a region can effectively be encoded without being identified. Accordingly, great error may be caused when predicting a code amount of the arithmetic coding from the variable length coding. However, the CAVLC can effectively encode a region without identifying the region well as compared to common variable length coding by adaptively changing context. Thus, the error is reduced, and a generated code amount at the time of employing the CABAC method can be estimated by encoding according to the CAVLC method. Accordingly, a generated code amount at the main encoding unit 70 employing the CABAC method can also be estimated by employing the CAVLC method at the code length computing unit 27. Note that the code length computing unit 27 can also suppress the circuit scale by employing the CAVLC method.

The code amount control unit 40 determines a target generated code amount to be assigned to 1 GOP from relationship between a bit rate and a GOP configuration. Also, the code amount control unit 40 predicts a quantizing parameter realizing a target generated code amount, and a generated code amount when employing this quantizing parameter based on 1 GOP worth of the generated code amount calculated at the pre-encoding unit 20. That is to say, the code amount control unit 40 predicts a quantizing parameter wherein the generated code amount of 1 GOP is equal to or smaller than the target generated code amount and most closely approximated to the target generated code amount, and a generated code amount when employing this quantizing parameter. Also, the code amount control unit 40 sets a quantizing parameter that realizes the target generated code amount from the predicted generated code amount, and outputs this to the quantization information determining unit 65.

The delay buffer 50 delays the image data of the input image by the time used for setting quantization information at the code amount control unit 40, and outputs the delayed image data to the quantization information distinguishing unit 60 and the main encoding unit 70.

The prediction processing unit 61 of the quantization information distinguishing unit 60 determines the most suitable prediction mode with the image of each frame of the image data supplied from the delay buffer 50 as an I picture (Intra encoded image) that is a reference picture, and also generates the image data of a predictive image from the image data. Also, the prediction processing unit 61 generates difference image data indicating difference between the image data supplied from the delay buffer 50, and the image data of the predictive image, and outputs this to the DCT unit 62.

The DCT unit 62 performs discrete cosine transform as to the difference image data to generate a DCT coefficient, and outputs this to the back search unit 63.

The back search unit 63 uses the supplied DCT coefficient to perform a calculation, and performs distinction of quantization information used for the last encoding. With distinction of quantization information, for example, such as disclosed in International Publication WO2009/035144, the DCT coeffecnt used for encoding is divided by a rescaling factor for back search processing to obtain a remainder for each macro block. Also, a rescaling factor is detected wherein the summation of remainders of macro blocks making up one picture becomes the minimum. Note that the rescaling factor is a transformation-matrix function for obtaining a DCT coefficient to be used for encoding from the quantizing matrix that is quantization information, the quantizing parameter, and the DCT coeffecnt to be used for decoding. The quantization information when the rescaling factor thus detected was generated is distinguished as quantization information used for the last encoding. Also, when two or more minimal values of the summation of remaiders have been detected, the quantizing parameter having a greater value is employed. Further, the back search unit 63 uses the quantization information in a range with the quantization information set at the code amount control unit 40 as a reference to perform distinction of the quantization information used for the last encoding.

Figure 2:
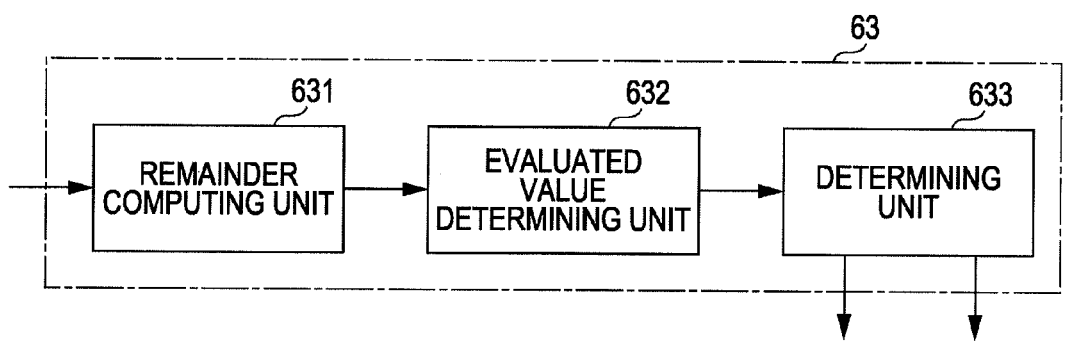
FIG. 2 is a diagram illustrating the configuration of a back search unit.

FIG. 2 illustrates the configuration of the back search unit 63. The back search unit 63 includes a remainder computing unit 631, an evaluated value determining unit 632, and a determining unit 633. The remainder computing unit 631 performs division of the DCT coefficient using the rescaling factor based on the quantization information in a range with the quantization information set at the code amount control unit 40 as a reference, and outputs the obtained remainder to the evaluated value determining unit 632.

Figure 3:
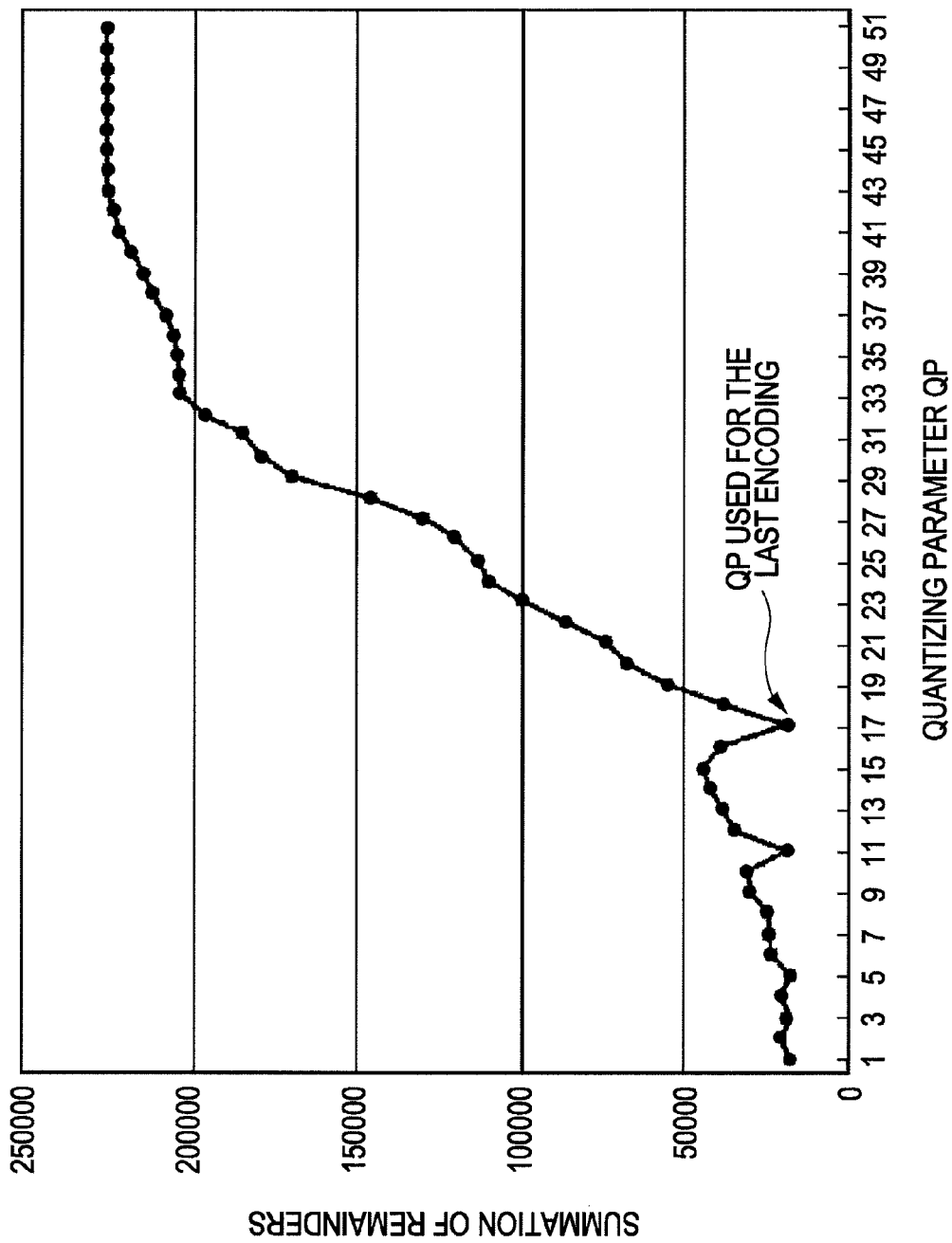
FIG. 3 is a diagram exemplifying relationship a quantizing parameter and the summation of remainders.

The evaluated value determining unit 632 calculates the summation of remainders in increments of pictures. Further, the evaluated value determining unit 632 standardizes the summation of the remainders by the rescaling factor to obtain an evaluated value. FIG. 3 is a diagram exemplifying relationship between the quantization information, e.g., quantizing parameter, and the summation of the remainders. As can be apparent from FIG. 3, the summation of the remainders has a nature to increase as the quantizing parameter increases. Accordingly, the evaluated value determining unit 632 standardizes the remainders by the rescaling factor to obtain an evaluated value so as to distinguish a quantizing parameter whereby the summation of the remainders becomes the minimum without receiving the influence of this nature. Also, the evaluated value determining unit 632 calculates the summation of evaluated values of macro blocks making up one picture, and outputs this to the determining unit 633.

Figure 4:
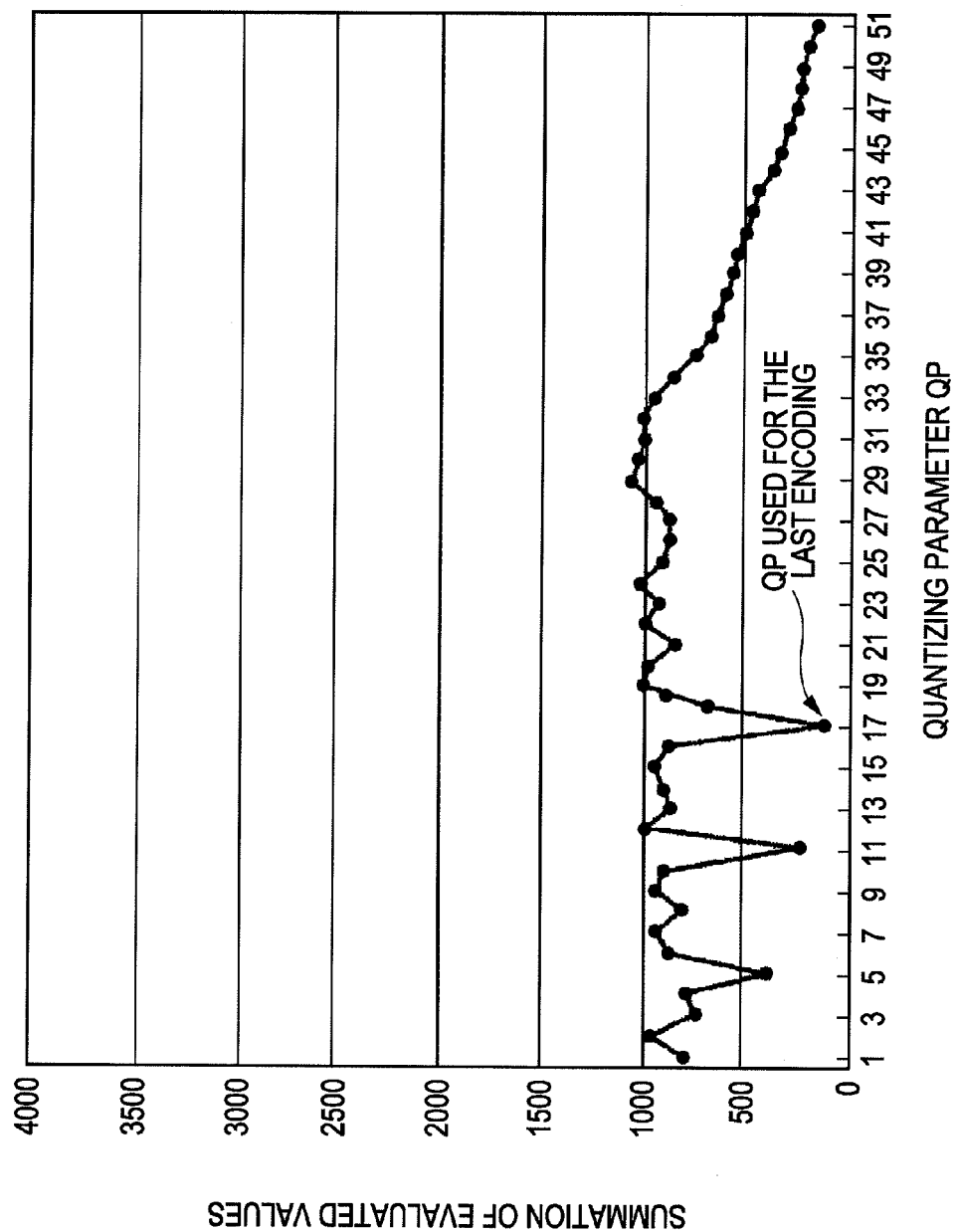
FIG. 4 is a diagram exemplifying relationship a quantizing parameter and the summation of evaluated values.

The determining unit 633 detects a rescaling factor whereby the summation of the evaluated values becomes the minimum, and outputs the quantizing parameter and the quantizing matrix of the detected rescaling factor to the quantization information determining unit 65 as the quantization information used at the time of performing the last encoding. FIG. 4 is a diagram exemplifying relationship between a quantizing parameter and the summation of the evaluated values. The determining unit 633 takes a quantizing parameter whereby the summation of the evaluated values becomes the minimum from the property of FIG. 4 as the quantization information used at the time of performing the last encoding.

Further, the back search unit 63 outputs an information signal, indicating a picture of which the quantization information has been distinguished, to the picture-type setting unit 11. Here, in the case that back search has been performed using image data obtained by decoding encoded data having a long GOP configuration, when the picture to be used for back search is an I picture, a remainder at the time of dividing the DCT coefficient by the rescaling factor based on the quantization information used for the last encoding becomes small. However, when the picture to be used for back search is a P picture or B picture, the remainder does not become small unlike I pictures. Accordingly, a frame set to an I picture in the last encoding can be detected depending on whether or not the quantization information used for the last encoding has been distinguished. The back search unit 63 generates an information signal indicating a frame set to an I picture in the last encoding, and outputs this to the picture-type setting unit 11.

The quantization information determining unit 65 outputs the quantization information distinguished at the quantization information distinguishing unit 60 to the main encoding unit 70. Also, when the quantization information is distinguished at the quantization information distinguishing unit 60, the quantization information determining unit 65 changes the quantization information set at the code amount control unit 40 to the quantization information distinguished at the quantization information distinguishing unit 60, and outputs this to the main encoding unit 70. Accordingly, in the case that the image data of the input image is the image data of a raw image which has not been encoded, the quantization information distinguishing unit 60 is not allowed to distinguish quantization information thereof, and accordingly, the quantization information set in the pre-encoding processing is output to the main encoding unit 70. Also, in the case that the image data of the input image is image data being now encoded, the quantization information distinguished at the quantization information distinguishing unit 60 is output to the main encoding unit 70.

The main encoding unit 70 performs encoding of the image data using the quantization information supplied from the quantization information determining unit 65. The prediction processing unit 71 of the main encoding unit 70 generates predictive image data based on the picture type set at the picture-type setting unit 11. The prediction processing unit 71 generates difference image data indicating error between the predictive image data and the image data of the input image, and outputs this to the DCT unit 72.

The DCT unit 72 performs discrete cosine transform as to the difference image data to generate a DCT coefficient, and outputs this to the quantizing unit 73.

The quantizing unit 73 uses the quantization information supplied from the quantization information determining unit 65 to perform quantization of the DCT coefficient, and outputs the quantized data to the inverse quantizing unit 74 and the variable length encoding unit 77.

The inverse quantizing unit 74 performs inverse quantization as to the quantized data to generate a DCT coefficient, and outputs this to the IDCT unit 75.

The IDCT unit 75 performs inverse discrete cosine transform of the DCT coefficient supplied from the inverse quantizing unit 74 to generate difference image data, and outputs this to the predictive image generating unit 76.

The predictive image generating unit 76 uses the difference image data to generate the image data of a local decoded image. Also, the predictive image generating unit 76 uses the image data from the delay buffer 50 to perform motion estimation between the current frame and the next temporally adjacent frame in increments of macro blocks. Further, the predictive image generating unit 76 performs motion compensation of the local decoded image based on the motion estimation result to generate a predictive image, and outputs this to the prediction processing unit 71.

The variable length encoding unit 77 performs encoding as to the quantized data by the CAVLC method or CABAC method to generate encoded streams, and outputs these. The variable length encoding unit 77 performs encoding of the quantized data using the CABAC method, for example, so as to reduce the data amount, to generate encoded streams.

When encoding the image data of which encoding had been performed last time, the image encoding device 10 thus configured sets a picture type so as to be equal to the picture type at the time of performing the last encoding to perform encoding of the image data. Also, the image encoding device 10 uses the quantization information used for the last encoding to perform encoding of the image data.

2. Operation of First Embodiment

Figure 5:
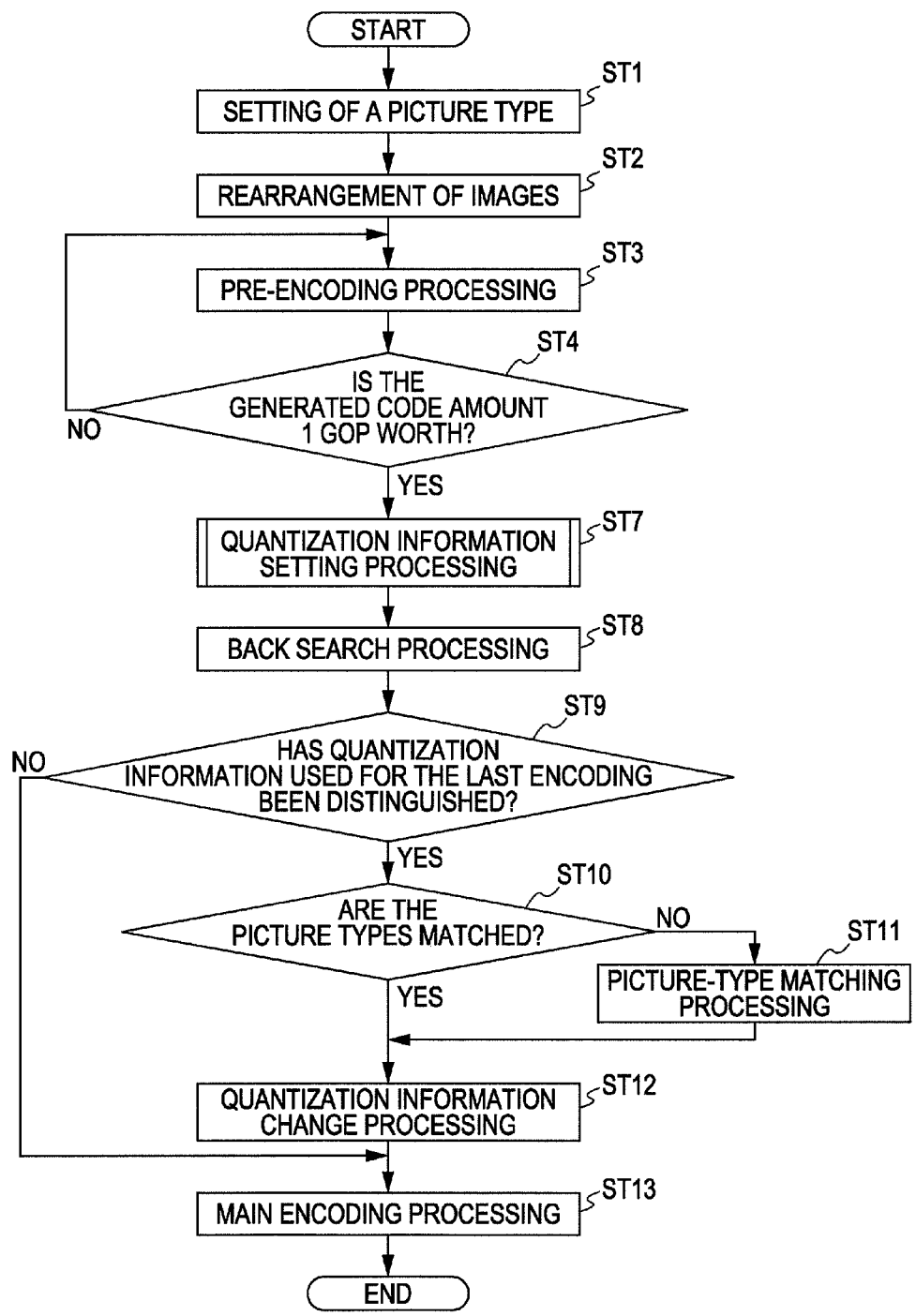
FIG. 5 is a flowchart illustrating the operation of the first embodiment.

Next, the operation of the first embodiment will be described. FIG. 5 is a flowchart illustrating the operation of the first embodiment. Note that FIG. 5 illustrates processing of 1 GOP.

In step ST1, the image encoding device 10 performs setting of a picture type. The image encoding device 10 sets a picture type to each frame of the image data at the picture-type setting unit 11 in accordance with a GOP (Group of Picture) configuration, and proceeds to step ST2.

In step ST2, the image encoding device 10 performs rearrangement of images. The image encoding device 10 rearranges the image data at the image rearrangement processing unit 12 from the display sequence to the encoding sequence based on the picture type set at the picture-type setting unit 11, and proceeds to step ST3.

In step ST3, the image encoding device 10 performs pre-encoding processing. The image encoding device 10 performs encoding of the image data at the pre-encoding unit 20 using the set picture type to calculate a generated code amount, and proceeds to step ST4.

In step ST4, the image encoding device 10 distinguishes whether or not the generated code amount has reached 1 GOP worth. In the event that the generated code amount calculated at the pre-encoding unit 20 has reached 1 GOP worth, the image encoding device 10 proceeds to step ST7, and in the event that the generated code amount has not reached 1 GOP worth, returns to step ST3.

In step ST7, the image encoding device 10 performs quantization information setting processing. The image encoding device 10 sets quantization information realizing a target generated code amount based on the generated code amount obtained by performing the pre-encoding processing, and proceeds to step ST8. Note that the quantization information setting processing will be described later.

In step ST8, the image encoding device 10 performs back search processing. The image encoding device 10 performs readout of the image data from the delay buffer 50, and performs calculation of a DCT coefficient with the image of each frame of the read image data as an I picture that is a reference picture. Further, the image encoding device 10 distinguishes quantization information whereby the summation of remainders in increments of pictures at the time of performing division of the DCT coefficient using quantization information in a range with the quantization information set in step ST7 as a reference becomes the minimum, as the quantization information used for the last encoding, and proceeds to step ST9.

In step ST9, the image encoding device 10 distinguishes whether or not the quantization information used for the last encoding has been distinguished. In the event that the back search processing has been performed, and quantization information, e.g., a quantizing parameter and a quantizing matrix have been distinguished, the image encoding device 10 proceeds to step ST10, and in the event that no quantization information has been distinguished, proceeds to step ST13.

In step ST10, the image encoding device 10 distinguishes whether or not picture types are matched. In the event that the picture type set at the picture-type setting unit 11, and the picture type of which the quantization information has been distinguished at the quantization information distinguishing unit 60 are not matched, the image encoding device 10 proceeds to step ST11, and in the event that the picture types are matched, proceeds to step ST12.

In step ST11, the image encoding device 10 performs picture type matching processing. The image encoding device 10 adjusts the GOP length of the subsequent GOP so as to match the picture type to be set to the image data, and the picture type at the time of performing the last encoding, and proceeds to step ST12. The image encoding device 10 determines a picture type to be set to the image data to be a reference picture when the picture type at the time of performing the last encoding is a reference picture, and determines a picture type to be set to the image data to be a non-reference picture when the picture type at the time of performing the last encoding is a non-reference picture.

In step ST12, the image encoding device 10 performs quantization information change processing. The image encoding device 10 changes the quantization information set in step ST7 to the quantization information distinguished in the back search processing in step ST8, and proceeds to step ST13. For example, the image encoding device 10 changes the quantizing parameter set in step ST7 to the quantizing parameter distinguished in step ST8.

In step ST13, the image encoding device 10 performs main encoding processing. In the event that the quantization information used for the last encoding has not been distinguished, the image encoding device 10 uses the quantization information set in step ST7 to perform encoding. Also, in the event that the quantization information used for the last encoding has been distinguished, the image encoding device 10 uses the quantization information changed in step ST12, i.e., the quantization information used for the last encoding to perform quantization.

Figure 6:
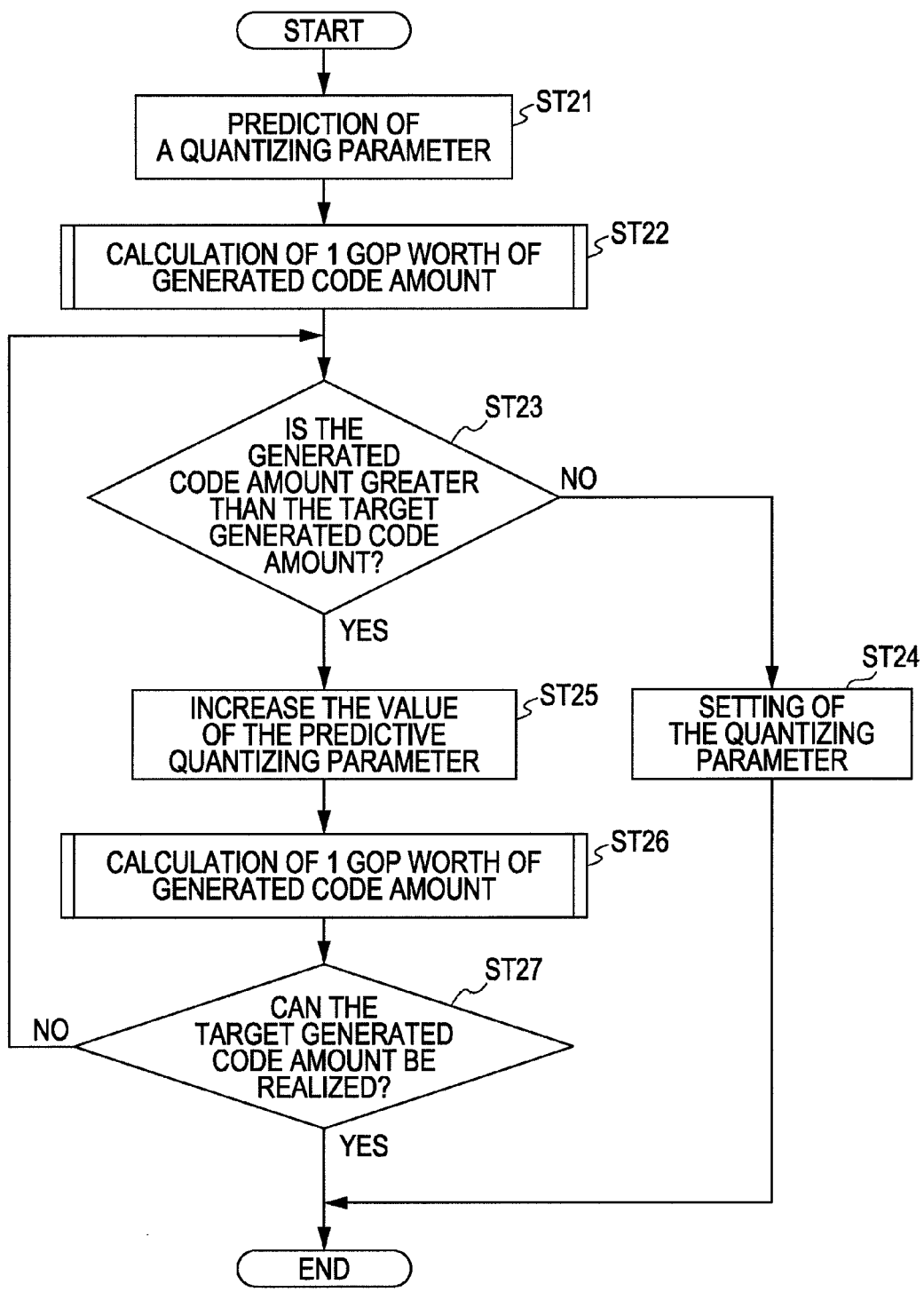
FIG. 6 is a flowchart illustrating quantization information setting processing.

FIG. 6 exemplifies a flowchart illustrating quantization information setting processing. In step ST21, the code amount control unit 40 performs prediction of a quantizing parameter. The code amount control unit 40 predicts a quantizing parameter for realizing a target generated code amount based on the generated code amount calculated at the pre-encoding unit 20, and proceeds to step ST22.

Figure 7:
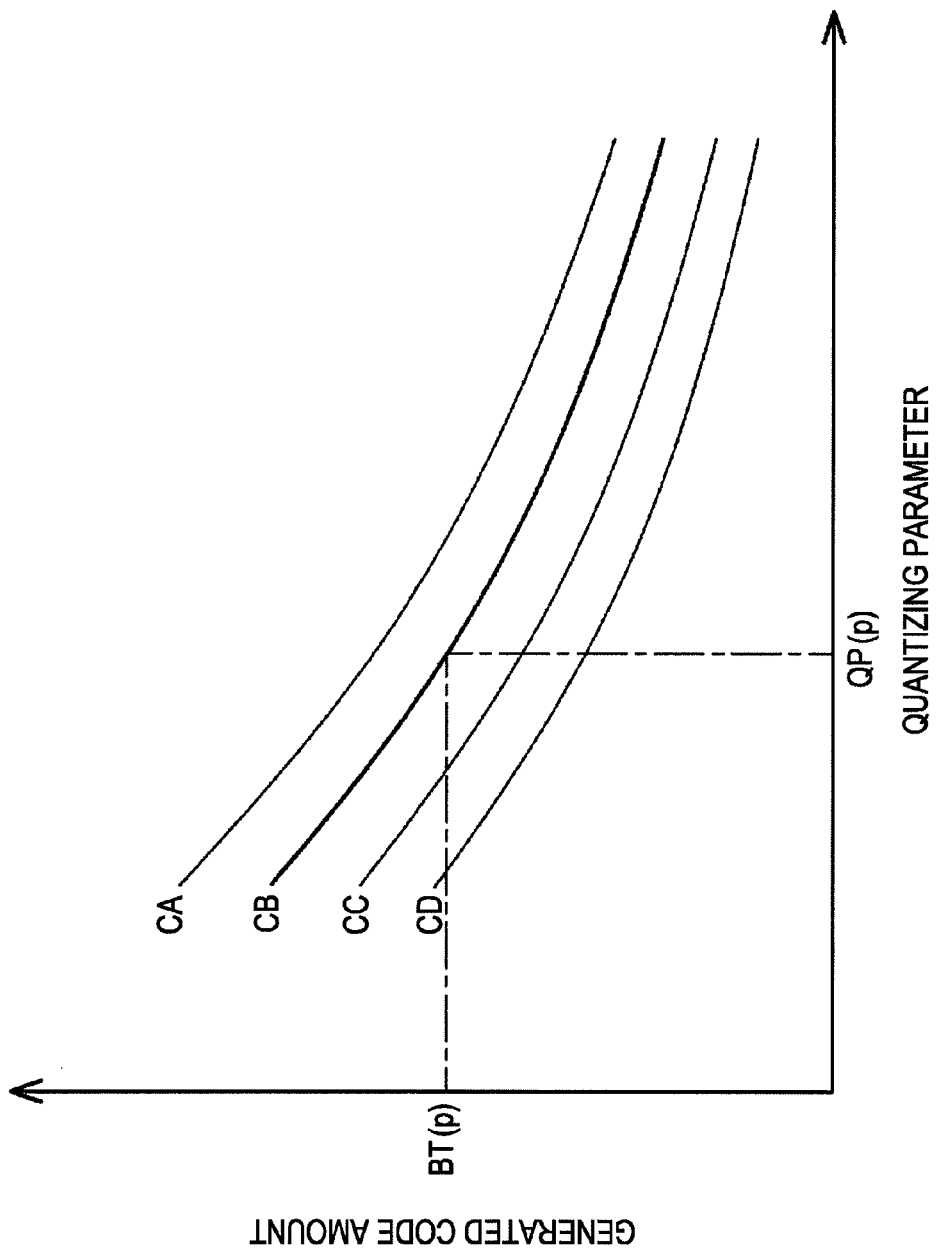
FIG. 7 is a diagram for describing processing for calculating a quantizing parameter and a generated code amount.

FIG. 7 is a diagram for describing processing for calculating a quantizing parameter and a later-described generated code amount. The code amount control unit 40 classifies macro blocks into groups according to the generated code amount BT(p) at the time of performing encoding using the fixed quantizing parameter QP(p) at the pre-encoding unit 20. Also, the code amount control unit 40 selects a predictive curve of the corresponding group, e.g., a predictive curve CB from multiple predictive curves indicating relationship between a quantizing parameter and a generated code amount provided for each group beforehand. Further, the code amount control unit 40 uses the selected predictive curve CB to predict a quantizing parameter whereby the generate code amount is equal to or smaller than the target generated code amount BT(t) and becomes a value most closely approximated thereto.

In step ST22, the code amount control unit 40 performs the calculation of 1 GOP worth of generated code amount. The code amount control unit 40 calculates 1 GOP worth of generated code amount of the predicted quantizing parameter, and proceeds to step ST23.

In step ST23, the code amount control unit 40 distinguishes whether or not 1 GOP worth of generated code amount is greater than a target generated code amount. When the generated code amount is not greater than the target generated code amount, the code amount control unit 40 proceeds to step ST24, and when the generated code amount is greater than the target generated code amount, proceeds to step ST25.

In step ST24, the code amount control unit 40 sets a quantizing parameter to be used for the main encoding processing from the predicted quantizing parameter. When difference between the generated code amount and the target generated code amount is small, the code amount control unit 40 determines the predicted quantizing parameter to be a quantizing parameter to be used for the main encoding processing. For example, when the generated code amount is smaller than increase in a generated code amount at the time of the value of the predicted quantizing parameter being reduced by one, the code amount control unit 40 determines the predicted quantizing parameter to be a quantizing parameter to be used for the main encoding processing, and ends the processing. Also, when the difference between the generated code amount and the target generated code amount is great, the code amount control unit 40 reduces the value of the predicted quantizing parameter so as to reduce the difference, and determines this to be a quantizing parameter to be used for the main encoding processing.

In step ST25, the code amount control unit 40 increases the value of the predicted quantizing parameter. The code amount control unit 40 determines an increase amount according to the difference between the generated code amount and the target generated code amount, increases the value of the predicted quantizing parameter, and proceeds to step ST26.

In step ST26, the code amount control unit 40 performs the calculation of 1 GOP worth of generated code amount. The code amount control unit 40 uses the quantizing parameter updated in step ST25 to perform the calculation of 1 GOP worth of generated code amount in the same way as with step ST22, and proceeds to step ST27.

In step ST27, the code amount control unit 40 distinguishes whether or not the target generated code amount is realizable. When distinguishing that the target generated code amount is unrealizable, the code amount control unit 40 returns to step ST23, and when distinguishing that the target generated code amount is realizable, determines the quantizing parameter updated in step ST25 to be a quantizing parameter to be used for the main encoding processing, and ends the processing. For example, the code amount control unit 40 determines the generated code amount at the time of using the quantizing parameter updated in the main encoding processing to be equal or smaller than the target generated code amount. Also, the code amount control unit 40 determines the generated code amount at the time of using a quantizing parameter smaller than the quantizing parameter updated in the main encoding processing by one to exceed the target generated code amount. At this time, the code amount control unit 40 distinguishes that the target generated code amount is realizable, and determines the updated quantizing parameter to be a quantizing parameter to be used for the main encoding processing.

Note that the quantization information setting processing is not restricted to processing illustrated in the flowchart in FIG. 6. For example, the increase amount or decrease amount of a quantizing parameter is set according to the difference between the generated code amount and the target code amount to perform the calculation of a generated code amount again. Also, when the difference between the generated code amount and the target code amount becomes small, a quantizing parameter whereby the target generated code amount is realizable may be searched by increasing or decreasing the quantizing parameter by one at a time.

Figure 8:
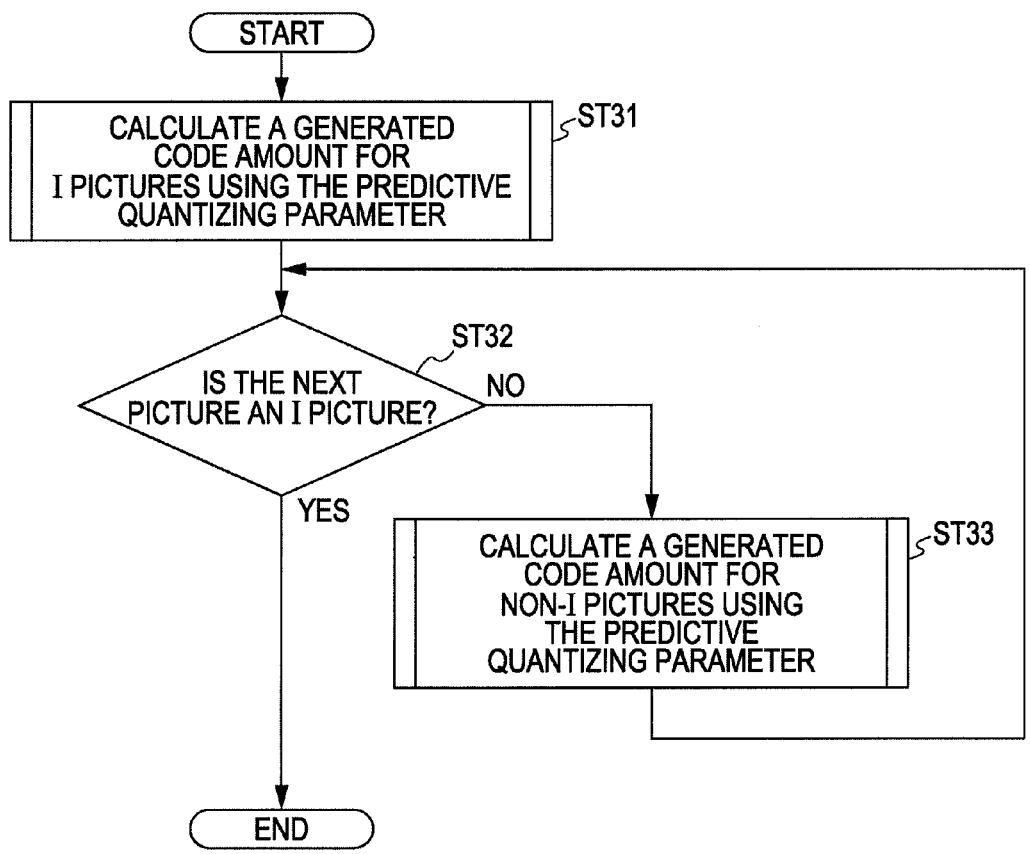
FIG. 8 is a flowchart illustrating processing for calculating 1 GOP worth of generated code amount.

FIG. 8 is a flowchart exemplifying processing for calculating 1 GOP worth of generated code amount. In step ST31, the code amount control unit 40 calculates the generated code amount of an I picture using the predicted quantizing parameter, and proceeds to step ST32.

In step ST32, the code amount control unit 40 distinguishes whether or not the next picture is an I picture. When the next picture is not an I picture, the code amount control unit 40 proceeds to step ST33, and when the next picture is an I picture, ends the processing for calculating 1 GOP worth of generated code amount.

In step ST33, the code amount control unit 40 calculates the generated code amount of a non-I picture, i.e., a P picture or B picture using the predicted quantizing parameter, and returns to step ST32.

Figure 9:
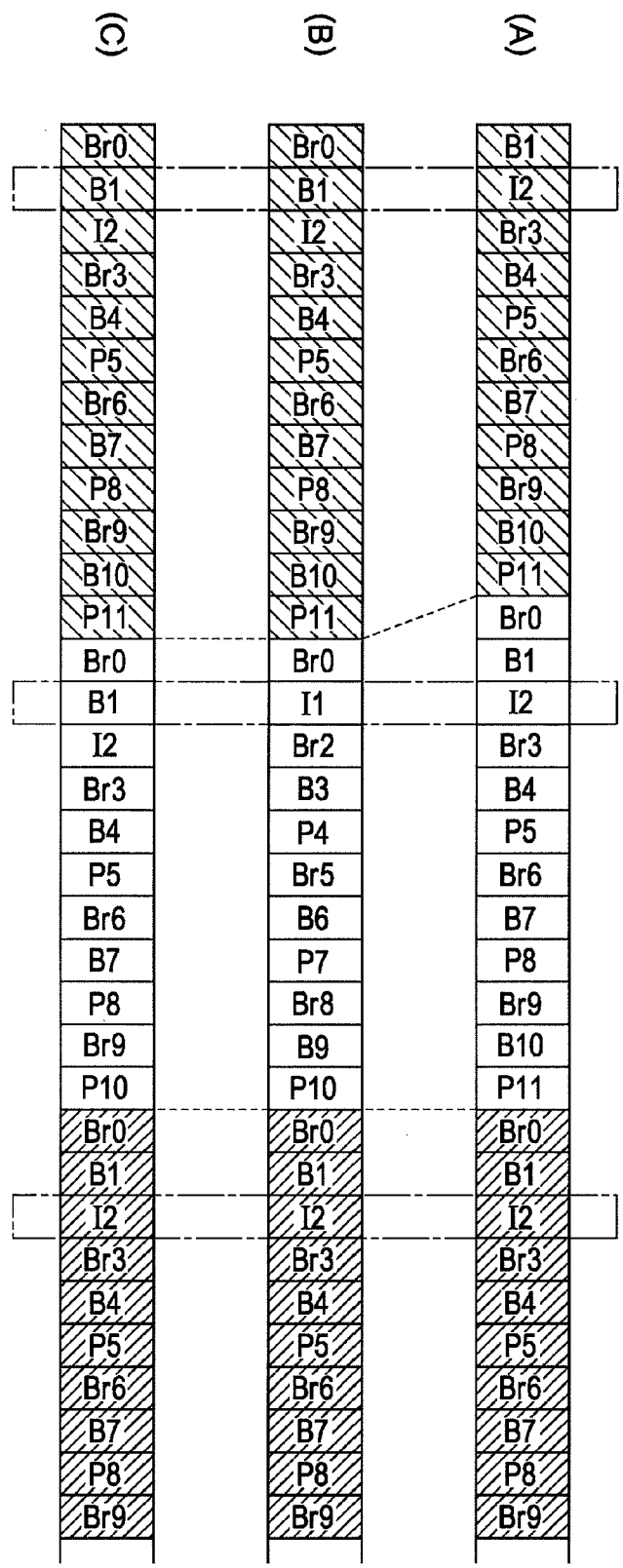
FIG. 9 is a diagram (part 1) for describing picture matching processing.
Figure 10:
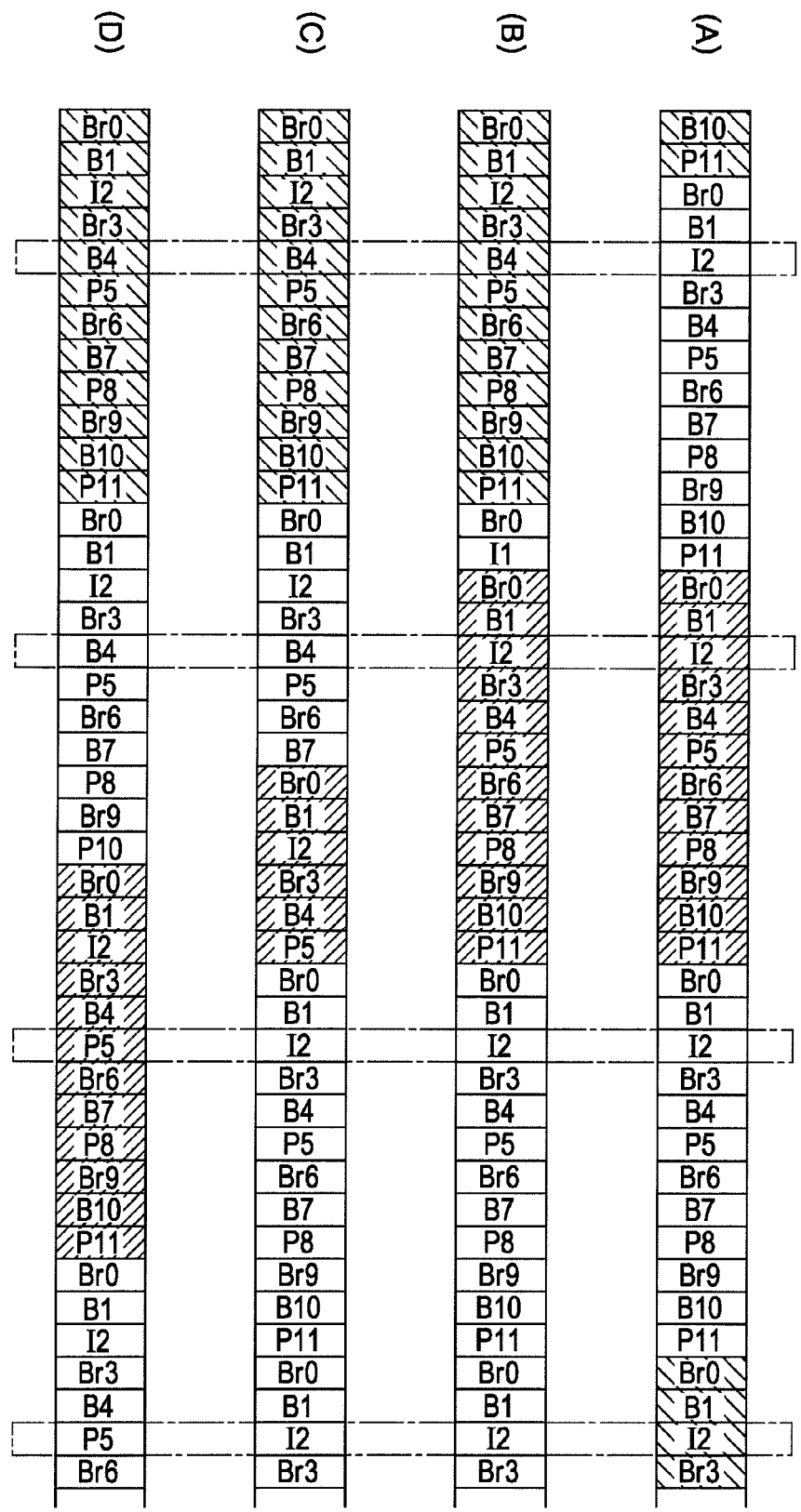
FIG. 10 is a diagram (part 2) for describing the picture matching processing.
Figure 11:
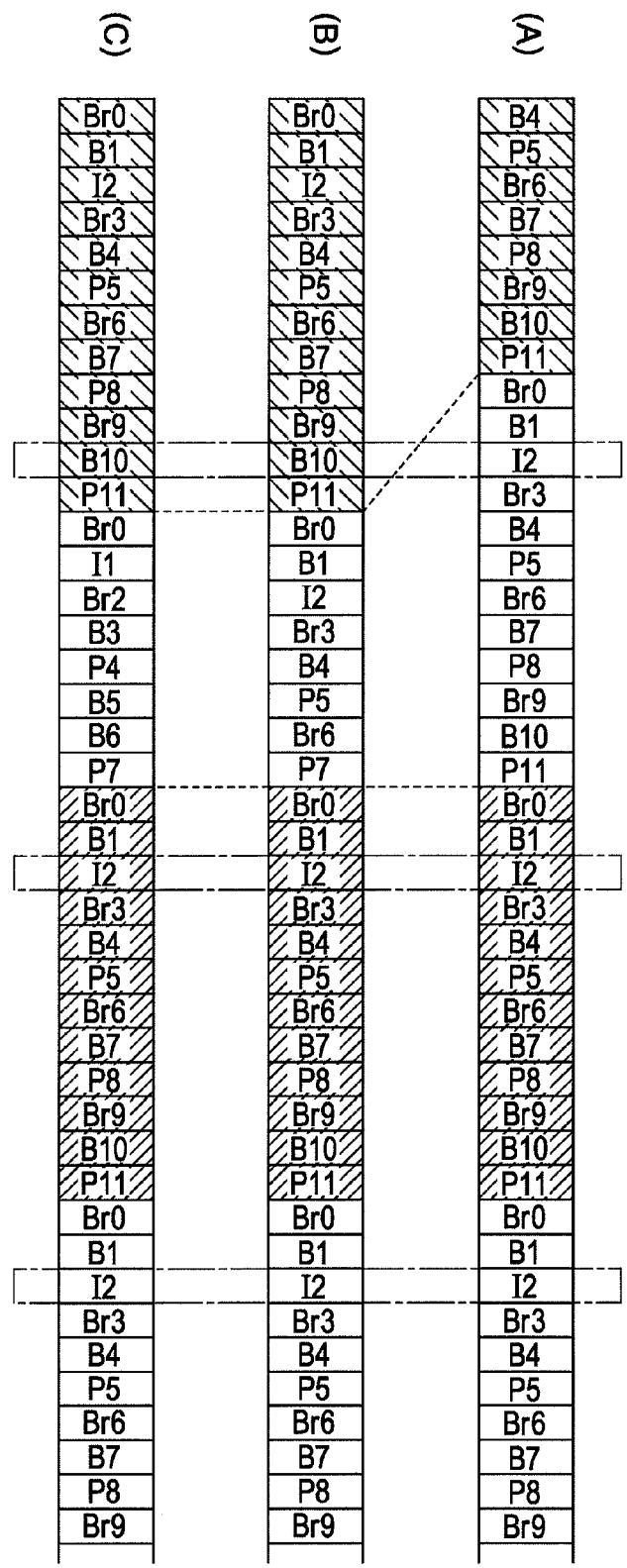
FIG. 11 is a diagram (part 3) for describing the picture matching processing.

Next, the picture matching processing will be described using FIGS. 9 through 11. FIG. 9 illustrates a case where the phase of a picture type set in the last encoding progresses rather than the phase of the picture type set at the picture-type setting unit 11. That is to say, FIG. 9 illustrates a case where quantization information has been distinguished at a picture earlier than the I picture set at the picture-type setting unit 11. Also, FIG. 10 illustrates a case where the phase of a picture type set in the last encoding is delayed rather than the phase of the picture type set at the picture-type setting unit 11, and the delay amount of this phase is small. That is to say, FIG. 10 illustrates a case where quantization information has been distinguished at a picture later than the I picture set at the picture-type setting unit 11, and somewhat separated from this I picture. Further, FIG. 11 illustrates a case where the phase of a picture type set in the last encoding is delayed rather than the phase of the picture type set at the picture-type setting unit 11, and the delay amount of this phase is great. That is to say, FIG. 11 illustrates a case where quantization information has been distinguished at a picture later than the I picture set at the picture-type setting unit 11, and greatly separated from this I picture. Note that in FIGS. 9 through 11, "Br" illustrates a B picture that can be used as a reference image by the standard of H.264/AVC. Also, FIGS. 9 through 11 illustrate picture types in the order before rearrangement of images is performed at the image rearrangement processing unit 12.

With the GOP set at the picture-type setting unit 11, the number of a picture of which the quantization information has been distinguished at the quantization information distinguishing unit 60 will be taken as a detected picture number PNB. Also, the number of B pictures earlier than the I picture from the detected picture number will be taken as the number of B pictures BN. When the set picture type differs from the picture type of which the quantization information has been distinguished at the quantization information distinguishing unit 60, the picture-type setting unit 11 adjusts the GOP length of the subsequent GOP. The picture-type setting unit 11 adjusts the GOP length to match a picture type to be set to the image data, and the picture type at the time of performing the last encoding. The picture-type setting unit 11 performs the calculation of Expression (1) to set the GOP length GL of the next GOP.

$$GL = PNB - BN \quad (1)$$

(A) in FIG. 9 illustrates a picture type set in the last encoding. Also, (B) and (C) in FIG. 9 illustrate picture types at the time of performing the matching processing. In the event that the phase of the picture type set in the last encoding progresses, i.e., in the event that the GOP length GL has a negative value, B pictures of an amount equivalent to the negative value are eliminated from the head of the next GOP. In FIG. 9, the phase of the picture type set in the last encoding progresses, for example, by one picture worth, and the detected picture number PNB is "1". Also, the number of B pictures is "2", and accordingly, the GOP length GL is "−1". Accordingly, such as illustrated in (B) in FIG. 9, for example, one picture "B1" of the B pictures positioned earlier than the I picture of the next GOP is eliminated. Thus, when eliminating the head B picture from the next GOP by the number of pictures of which the phase progresses, the picture type set at the picture-type setting unit 11, and the picture type set in the last encoding can be matched.

Also, such as illustrated in (C) in FIG. 9, for example, the GOP length of the next GOP is reduced by one picture, and a P picture is set to the last picture. Thus, when reducing the next GOP length by an amount equivalent to the negative value, with the next GOP of the GOP from which the GOP length has been reduced, the picture type set at the picture-type setting unit 11, and the picture type set in the last encoding can be matched.

Thus, in the event that the phase of the picture type set in the last encoding progresses rather than the picture type set at the picture-type setting unit 11, adjustment of the GOP length is performed by reducing the number of pictures earlier than an I picture by the number of progressing pictures, whereby a picture type to be set to the image data can be matched with the picture type at the time of performing the last encoding. For example, an I picture to be set to the image data can be matched with the I picture at the time of performing the last encoding.

(A) in FIG. 10 illustrates a picture type set in the last encoding. Also, (B), (C), and (D) in FIG. 10 illustrate a picture type at the time of performing the matching processing. In the event that the phase delay of the picture type set in the last encoding is small, the GOP length of the next GOP will be taken as the calculated GOP length GL. In FIG. 10, a quantizing parameter and a quantizing matrix are first detected in a picture "B4", and the number of B pictures earlier than an I picture is "2", and accordingly, the GOP length GL is "4−2=2". Accordingly, such as illustrated in (B) in FIG. 10, for example, the GOP length of the next GOP will be set to "2". Thus, in the event that the next GOP has the GOP length GL, with the GOP after next, a picture type to be set at the picture-type setting unit 11 can be matched with the picture type set in the last encoding.

Also, in the event that the phase delay is small, the GOP length GL becomes a small value, and accordingly, a short GOP is generated. Accordingly, the picture-type setting unit 11 adjusts the picture types of the next GOP and the GOP after next so as not to generate a short GOP. The picture-type setting unit 11 matches a picture type to be set to the subsequent pictures at the picture-type setting unit 11 with the picture type set in the last encoding. In this case, an interval GM between an I picture and a P picture is used to set the GOP length of the next GOP to (GOP length GL+integer multiple of the interval GM).

For example, in FIG. 10, the interval GM between an I picture and a P picture is "3", and the GOP length GL is "2", and accordingly, the GOP length of the next GOP will be, for example, "2+3×2", such as illustrated in (C) in FIG. 10. Thus, with the GOP after next, a reference picture and a non-reference picture set at the picture-type setting unit 11 can be matched with the picture type set in the last encoding. Further, with the subsequent GOPs, the picture type set at the picture-type setting unit 11, and the picture type set in the last encoding are matched.

Also, a picture type to be set at the picture-type setting unit 11 may be matched with the picture type set in the last encoding by suppressing the adjustment to the minimum so as not to cause a short GOP. In this case, the GOP length will be set to "the usual number of GOPs−(integer multiple of the interval GM−GL)". In FIG. 10, the usual number of GOPs is "12", the interval GM is "3", and the GOP length GL is "2", and accordingly, such as illustrated in (D) in FIG. 10, the GOP length of the next GOP will be "12−(3−2)". Thus, with the GOP after next, a picture type to be set at the picture-type setting unit 11 can be matched with the picture type set in the last encoding by suppressing the adjustment to the minimum, and accordingly, deterioration in image quality can be reduced by suppressing the adjustment to the minimum.

(A) in FIG. 11 illustrates a picture type set in the last encoding. Also, (B) and (C) in FIG. 11 illustrate a picture type at the time of performing the matching processing. In the event that the phase delay of the picture type set in the last encoding is great, the GOP length of the next GOP will be set to the calculated GOP length GL. In FIG. 11, quantization information is first distinguished in a picture "B10", and the number of B pictures earlier than an I picture is "2", and accordingly, the GOP length GL are "10−2=8". Accordingly, such as illustrated in (B) in FIG. 11, for example, the GOP length of the next GOP will be set to "8". Thus, in the event that the next GOP has the GOP length GL, with the GOP after next, a picture type to be set at the picture-type setting unit 11 can be matched with the picture type set in the last encoding.

Also, in the event that the next GOP has the GOP length GL, with the next GOP, an I picture or B picture may be set instead of a P picture set in the last encoding so as to reduce deterioration in image quality. That is to say, when the GOP length GL is not the integer multiple of the interval GM between an I picture and a P picture, adjustment of the number of edges is performed with a B picture on the head side. Such as illustrated in (B) in FIG. 11, for example, "B1" that is a B picture on the head side is eliminated.

Thus, in the case that the phase of the picture type set in the last encoding is delayed as compared to the picture type set at the picture-type setting unit 11, such as illustrated in FIGS. 10 and 11, adjustment of the GOP length is performed by reducing the number of pictures of the next single or multiple GOPs, whereby the picture types of a reference picture and a non-reference picture to be set to the image data can be matched with the picture type at the time of performing the last encoding. Also, such as illustrated in (B) in FIG. 10 and (C) in FIG. 10, and FIG. 11, adjustment of the GOP length is performed, whereby an I picture to be set to the image data can be matched with the I picture at the time of performing the last encoding. Thus, when performing the picture matching processing, the picture-type setting unit 11 can perform the setting of a picture type so as to match with the picture type set in the last encoding. Accordingly, when improving subjective image quality by providing difference of the image qualities of a reference picture and a non-reference picture, the non-reference picture of which the image quality is inferior as compared to the reference picture can be prevented from being set to the reference picture in the next encoding. Therefore, deterioration in image quality can be reduced even when encoding and decoding of the image data is repeated.

Also, in the event that the quantization information used for the last encoding has been distinguished at the quantization information distinguishing unit 60, the quantization information change processing is performed, where the quantization information set at the code amount control unit 40 is changed to the quantization information distinguished at the quantization information distinguishing unit 60. Therefore, in the event that the quantization information used for the last encoding has been distinguished, encoding is performed at the main encoding unit 70 using the distinguished quantization information. Thus, encoding is performed at the main encoding unit 70 using the quantization information used for the last encoding, and accordingly, quantization distortion can be prevented from repeatedly being superimposed, and deterioration in image quality can be reduced even when encoding and decoding of the image data is repeated.

Further, with distinction of the quantization information used for the last encoding at the quantization information distinguishing unit 60, the range of quantization information to be distinguished is set with the quantization information set by performing the pre-encoding processing as a reference. Therefore, the quantization information used for the last encoding can be distinguished even though calculation is not performed using all of the quantization information, and accordingly, a calculation amount at the quantization information distinguishing unit 60 can be reduced.

3. Configuration of Second Embodiment

Next, description will be made regarding a case where the setting of quantization information is performed with higher precision than the first embodiment, and this set quantization information is used, thereby further facilitating distinction of the quantization information used for the last encoding at the quantization information distinguishing unit 60. Note that, with the second embodiment, description will be made regarding a case where the setting of a quantizing matrix is also performed at the code amount control unit.

With the second embodiment, an intra pre-encoding unit 30 serving as a third encoding unit is further provided, and predictive accuracy such as a quantizing parameter or the like is improved using the generated code amount calculated at the intra pre-encoding unit 30.

Figure 12:
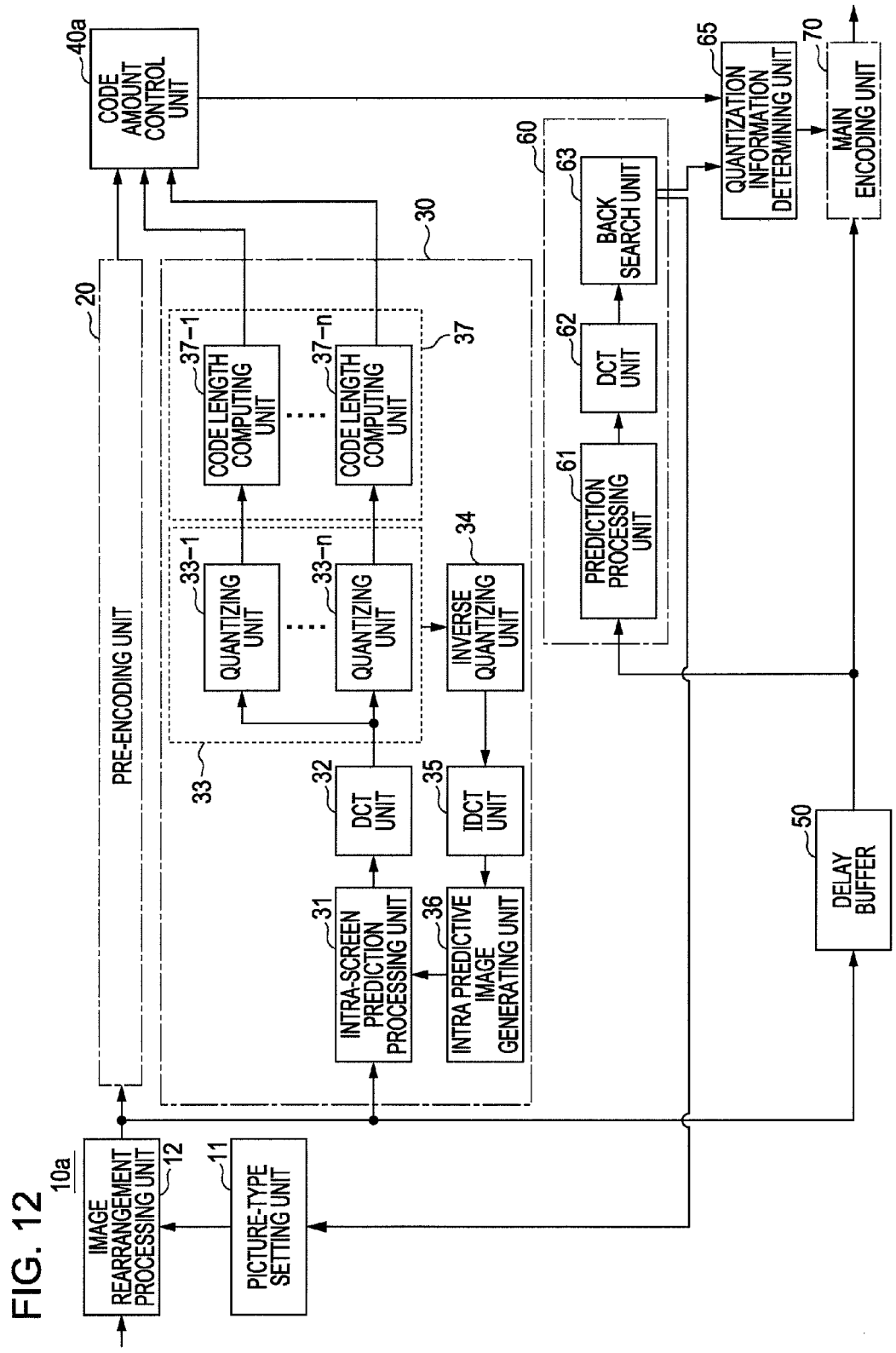
FIG. 12 is a diagram illustrating the configuration of a second embodiment.

FIG. 12 illustrates the configuration of the second embodiment. An image encoding device 10a includes the picture-type setting unit 11, the image rearrangement processing unit 12, the pre-encoding unit 20 serving as a first encoding unit, the intra pre-encoding unit 30 serving as a third encoding unit, a code amount control unit 40a, the delay buffer 50, the quantization information distinguishing unit 60, the quantization information determining unit 65, and the main encoding unit 70 serving as a second encoding unit. Note that in FIG. 12, the pre-encoding unit 20 and the main encoding unit 70 have the same configuration as with the first embodiment, and accordingly, the pre-encoding unit 20 and the main encoding unit 70 are schematically illustrated in FIG. 12.

The intra pre-encoding unit 30 includes an intra-screen prediction processing unit 31, a DCT unit 32, a quantizing unit 33, an inverse quantizing unit 34, an IDCT unit 35, an intra predictive image generating unit 36, and a code length computing unit 37. Also, the quantizing unit 33 is configured of multiple stages of quantizing units 33-1 through 33-$n$, and the code length computing unit 37 is configured of multiple stages of code length computing units 37-1 through 37-$n$.

With such a configuration, the picture-type setting unit 11 sets a picture type as to each frame of the image data of the input image in accordance with the long GOP configuration such as described above. Also, when the set picture type, and the picture type of which the quantization information has been distinguished at the quantization information distinguishing unit 60 differ, the picture types are matched by controlling the settings of the subsequent picture types.

The image rearrangement processing unit 12 rearranges the image data of the input image in the sequence of pictures from the display sequence to the encoding sequence in accordance with the picture type set at the picture-type setting unit 11. The pre-encoding unit 20 performs calculation of a generated code amount when encoding of the image data has been performed using a fixed quantizing parameter, and outputs the calculated generated code amount to the code amount control unit 40a.

The intra pre-encoding unit 30 performs encoding with a plurality of quantization information with all of the image data as I pictures, and calculates a generated code amount for each of the quantization information to output this to the code amount control unit 40a. The intra-screen prediction processing unit 31 of the intra pre-encoding unit 30 generates difference image data indicating error between the image data of the input image, and the predictive image data generated at the intra predictive image generating unit 36 to output this to the DCT unit 32.

The DCT unit 32 performs discrete cosine transform as to the difference image data to generate a DCT coefficient, and outputs this to the quantizing unit 33.

The quantizing unit 33 is configured of multiple stages, e.g., nine stages of quantizing units 33-1 through 33-9. The quantizing units 33-1 through 33-9 perform quantization in accordance with nine conditions by combining a plurality of quantization information, e.g., three different quantizing parameters QP(i0), QP(i1), and QP(i2), and three different quantizing matrices QMF, QMN, and QMS. The quantizing units 33-1 through 33-9 outputs the quantized data obtained by performing quantization of the DCT coefficient to the code length computing unit 37. Also, the quantizing unit 33 selects one of the quantized data generated at the quantizing units 33-1 through 33-9, and outputs this to the inverse quantizing unit 34.

FIGS. 13A through 13C exemplify the quantizing matrices QMF, QMN, and QMS. FIG. 13A illustrates the quantizing matrix QMF. With the quantizing matrix QMF, all matrix values are equal values. That is to say, the quantizing matrix QMF is a quantizing matrix having a flat property. FIG. 13B illustrates the quantizing matrix QMN. With the quantizing matrix QMN, the matrix value of a high-frequency component is greater than the matrix value of a low-frequency component. That is to say, the quantizing matrix QMN is a quantizing matrix having a common property wherein reduction of high-frequency components is performed. FIG. 13C illustrates the quantizing matrix QMS. With the quantizing matrix QMS, the matrix value of a high-frequency component is a further greater value as compared to the quantizing matrix QMN. That is to say, the quantizing matrix QMS is a quantizing matrix having a property wherein reduction of high-frequency components is further increased as compared to the quantizing matrix QMN.

The inverse quantizing unit 34 performs inverse quantization as to the quantized data supplied from the quantizing unit 33 to generate DCT coefficient data, and outputs this to the IDCT unit 35.

The IDCT unit 35 performs inverse discrete cosine transform of the DCT coefficient data supplied from the inverse quantizing unit 34 to generate the difference image data, and outputs this to the intra predictive image generating unit 36.

The intra predictive image generating unit 36 uses the difference image data to generate the image data of the local decoded image. Also, the intra predictive image generating unit 36 outputs the image data of the local decoded image to the intra-screen prediction processing unit 31 as predictive image data.

The code length computing unit 37 is configured of multiple stages, e.g., nine stages of code length computing units 37-1 through 37-9 corresponding to the quantizing unit 33. The code length computing units 37-1 through 37-9 perform encoding using the same method as with the code length computing unit 27 of the pre-encoding unit 20 to calculate a generated code amount for each macro block, and output this to the code amount control unit 40a.

The code amount control unit 40a calculates an identification value that can identify whether or not there are many high-frequency components, from the generated code amount calculated at the intra pre-encoding unit 30, and when determining that this identification value is greater than a threshold, and there are many high-frequency components, selects a quantizing matrix that reduces the high-frequency components. Also, when determining that this identification value is equal to or less than a threshold, and there are few high-frequency components, the code amount control unit 40a selects a quantizing matrix wherein reduction in the high-frequency components is small.

Also, the code amount control unit 40a determines a target generated code amount to be assigned to 1 GOP from relationship between a bit rate and a GOP configuration. The code amount control unit 40a predicts a quantizing parameter realizing a target generated code amount, and a generated code amount when employing this quantizing parameter based on 1 GOP worth of the generated code amount calculated at the pre-encoding unit 20. That is to say, the code amount control unit 40a predicts a quantizing parameter wherein the generated code amount of 1 GOP is equal to or smaller than the target generated code amount and most closely approximated to the target generated code amount, and a generated code amount when employing this quantizing parameter.

Also, the code amount control unit 40a corrects the predicted generated coded amount in accordance with the generated code amount calculated at the intra pre-encoding unit 30. Further, the code amount control unit 40a sets a quantizing parameter and a quantizing matrix for realizing the target generated code amount from the generated code amount after correction. Here, when setting a quantizing matrix different from the quantizing matrix employed at the pre-encoding unit 20, the code amount control unit 40a calculates a correction coefficient. Further, the code amount control unit 40a corrects the predicted generated code amount using the correction coefficient. The code amount control unit 40a selects, for example, a generated code amount BT at the time of employing the quantizing matrix employed at the pre-encoding unit 20, and a generated code amount at the time of employing the selected quantizing matrix from the generated code amounts calculated at the intra pre-encoding unit 30. The code amount control unit 40a calculates a correction coefficient from the selected two generated code amounts.

The delay buffer 50 delays the image data of the input image by the time used for setting quantization information at the code amount control unit 40a, and outputs the delayed image data to the quantization information distinguishing unit 60 and the main encoding unit 70.

The quantization information distinguishing unit 60 calculates a DCT coefficient with the image of each frame of the image data as an I picture that is a reference picture. Further, the quantization information distinguishing unit 60 performs division of the DCT coefficient using quantization information in a range with the quantization information determined at the code amount control unit 40*a* as a reference, and distinguishes quantization information that minimizes the summation of remainders in increments of pictures to be the quantization information used at the time of performing the last encoding.

The main encoding unit 70 uses the quantization information set at the code amount control unit 40*a* to perform encoding of the image data based on the picture type set at the picture-type setting unit 11. Also, in the event that quantization information has been distinguished at the quantization information distinguishing unit 60, and the quantization information set at the code amount control unit 40*a* is changed to the quantization information distinguished at the quantization information distinguishing unit 60 by the quantization information determining unit 65, the main encoding unit 70 uses this changed quantization information to perform encoding of the image data.

4. Operation of Second Embodiment

Next, the operation of the second embodiment will be described. FIG. 14 is a flowchart illustrating the operation of the second embodiment. Note that the processing corresponding to the operation of the image encoding device illustrated in FIG. 5 will be denoted with the same step number.

In step ST1, the image encoding device 10*a* performs setting of a picture type, and proceeds to step ST2. In step ST2, the image encoding device 10*a* performs rearrangement of images. In step ST3, the image encoding device 10*a* performs the pre-encoding processing. In step ST4, the image encoding device 10*a* distinguishes whether or not the generated code amount calculated in the pre-encoding processing has reached 1 GOP worth. In the event that the generated code amount calculated at the pre-encoding unit 20 has reached 1 GOP worth, the image encoding device 10*a* proceeds to step ST7, and in the event that the generated code amount has not reached 1 GOP worth, returns to step ST3.

In step ST5, the image encoding device 10*a* performs intra pre-encoding processing. The image encoding device 10*a* performs encoding at the intra pre-encoding unit 30 with each frame of the image data as an I picture to calculate a generated code amount, and proceeds to step ST6. Also, the image encoding device 10*a* performs encoding in parallel in accordance with nine conditions by combining a plurality of quantization information, e.g., three different quantizing parameters QP(i0), QP(i1), and QP(i2), and three different quantizing matrices QMF, QMN, and QMS in the intra pre-encoding processing to calculate a generated code amount.

In step ST6, the image encoding device 10*a* distinguishes whether or not the generated code amount has reached 1 GOP worth. In the event that the generated code amount calculated at the intra pre-encoding unit 30 has reached 1 GOP worth, the image encoding device 10*a* proceeds to step ST7. Also, in the event that the generated code amount has not reached 1 GOP worth, the image encoding device 10*a* returns to step ST5.

In step ST7, the image encoding device 10*a* performs the quantization information setting processing. In step ST8, the image encoding device 10*a* performs the back search processing. In step ST9, the image encoding device 10*a* distinguishes whether or not the quantization information used for the last encoding has been distinguished. In the event that the back search processing has been performed, and quantization information, e.g., a quantizing parameter and a quantizing matrix have been distinguished, the image encoding device 10*a* proceeds to step ST10, and in the event that no quantization information has been distinguished, proceeds to step ST13. In step ST10, the image encoding device 10*a* distinguishes whether or not picture types are matched. In the event that the picture type set at the picture-type setting unit 11, and the picture type of which the quantization information has been distinguished at the quantization information distinguishing unit 60 are not matched, the image encoding device 10*a* proceeds to step ST11, and in the event that the picture types are matched, proceeds to step ST12. In step ST11, the image encoding device 10*a* performs the picture type matching processing. In step ST12, the image encoding device 10*a* performs the quantization information change processing. In step ST13, the image encoding device 10*a* performs the main encoding processing.

Further, the image encoding device 10*a* performs the quantization information setting processing illustrated in FIG. 6, and the processing for calculating 1 GOP worth of generated code amount illustrated in FIG. 8, and so forth, and performs the setting of quantization information for realizing a target generated code amount in a high-precision manner. Next, generated code amount calculation processing according to the second embodiment will be described.

FIG. 15 is a diagram for describing a quantizing parameter in the case of providing the intra pre-encoding processing unit 30, and later-described generated code amount calculation processing. The code amount control unit 40*a* classifies macro blocks into groups according to the generated code amount BT(p) at the time of performing encoding using the fixed quantizing parameter QP(p) at the pre-encoding unit 20. Also, as described above, the code amount control unit 40*a* selects a predictive curve of the corresponding group, e.g., a predictive curve CB from multiple predictive curves indicating relationship between a quantizing parameter and a generated code amount provided for each group beforehand. Further, such as illustrated in FIG. 15, the code amount control unit 40*a* uses the selected predictive curve CB to predict a quantizing parameter QP(t) whereby the generated code amount is equal to or smaller than the target generated code amount BT(t) and becomes a value most closely approximated thereto. The code amount control unit 40*a* uses this predicted quantizing parameter QP(t) to predict the generated code amount of an I picture, and the generated code amount of a non-I picture.

In the event of predicting the generated code amount of an I picture using the predicted quantizing parameter, the code amount control unit 40*a* predicts a generated code amount at the time of the predicted quantizing parameter being employed based on the generated code amount of the pre-encoding processing. This predicted generated code amount will be referred to as a first generated code amount. Also, the code amount control unit 40*a* calculates a generated code amount at the time of the predicted quantizing parameter being employed from the generated code amount obtained in the intra pre-encoding processing. This calculated generated code amount will be referred to as a second generated code amount.

The code amount control unit 40*a* calculates a correction coefficient from the first generated code amount and the second generated code amount. Further, the code amount control unit 40*a* corrects the first generated code amount by the calculated correction coefficient, and takes the first generated code amount after correction as the generated code amount of an I picture at the time of the predicted quantizing parameter being employed. Also, the code amount control unit 40*a* calculates high-frequency component cost indicating the state of a high-frequency component in an I picture, and uses the calculated high-frequency component cost to perform correction of the first generated code amount.

In the event of predicting the generated code amount of a non-I picture using the predicted quantizing parameter, the code amount control unit 40*a* predicts a generated code amount at the time of the predicted quantizing parameter being employed based on the generated code amount of the pre-encoding processing. This predicted generated code amount will be referred to as a third generated code amount. Also, the code amount control unit 40*a* calculates a correction coefficient in a non-I picture, uses this correction coefficient to perform correction of the third generated code amount, and takes the third generated code amount after correction as the generated code amount of a non-I picture at the time of the predicted quantizing parameter being employed.

Figure 16:
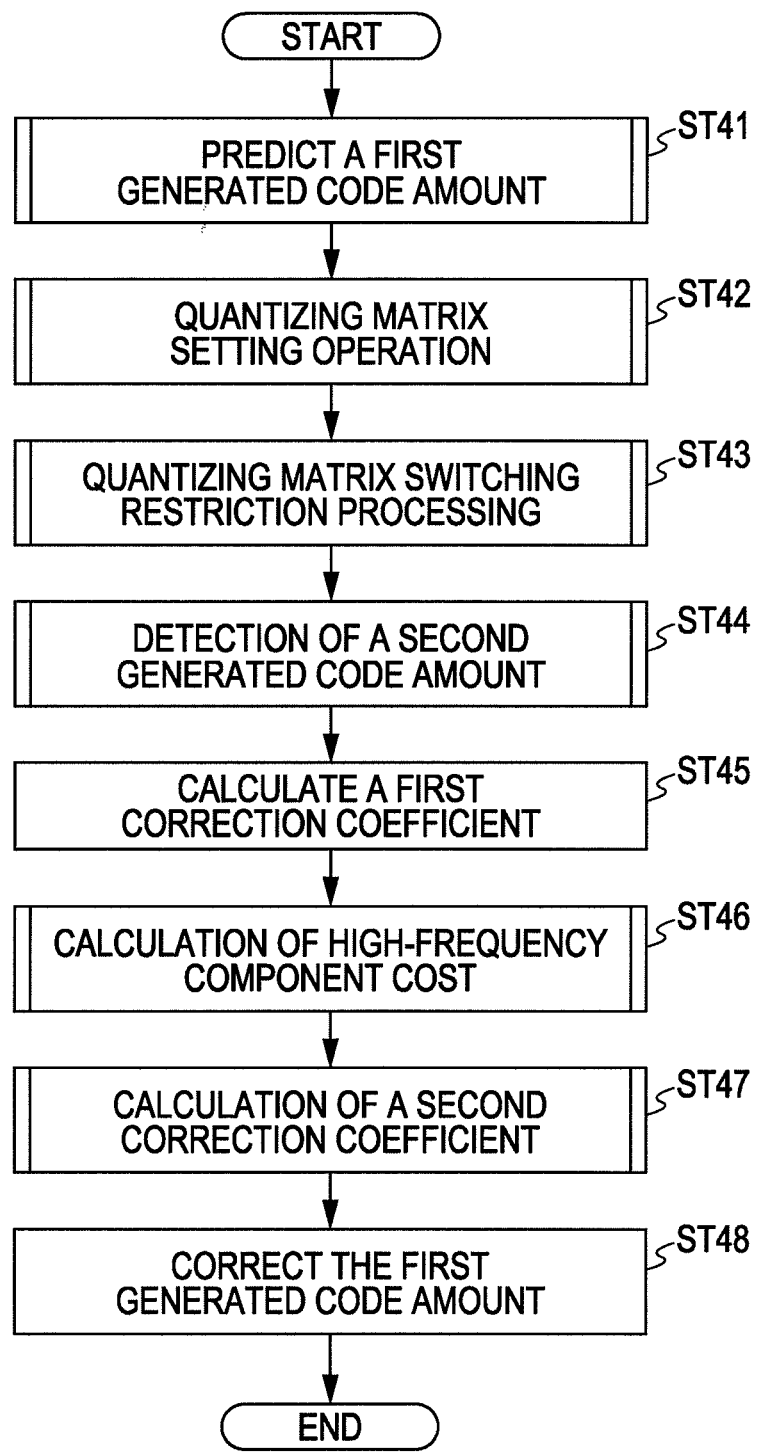
FIG. 16 is a flowchart illustrating generated code amount calculation processing for I pictures.

FIG. 16 is a flowchart illustrating generated code amount calculation processing for I pictures at the time of the predicted quantizing parameter being employed.

In step ST41, the code amount control unit 40*a* predicts the first generated code amount. The code amount control unit 40*a* predicts a generated code amount at the time of employing the predicted quantizing parameter, takes this as the first generated code amount, and proceeds to step ST42. For example, such as illustrated in FIG. 15, the code amount control unit 40*a* uses the selected predictive curve CB to predict a quantization parameter whereby the generated code amount has a value equal to or less than the target generated code amount BT(t) and most closely approximated thereto, and predicts a generated code amount at the time of employing this predicted quantizing parameter. That is to say, the code amount control unit 40*a* takes the generated code amount BT(pt) of the predicted quantizing parameter QP(t) as the first generated code amount, and proceeds to step ST42. Note that the quantizing parameter QP(p) should be set to a small value beforehand so that the generated code amount at the time of performing encoding using the quantizing parameter QP(p) becomes greater than the target generated code amount. In the event of thus setting the quantizing parameter QP(p), a basic quantizing parameter can be set so as to decrease the generated code amount equal to or smaller than the target generated code amount and most closely approximated thereto.

Figure 17:
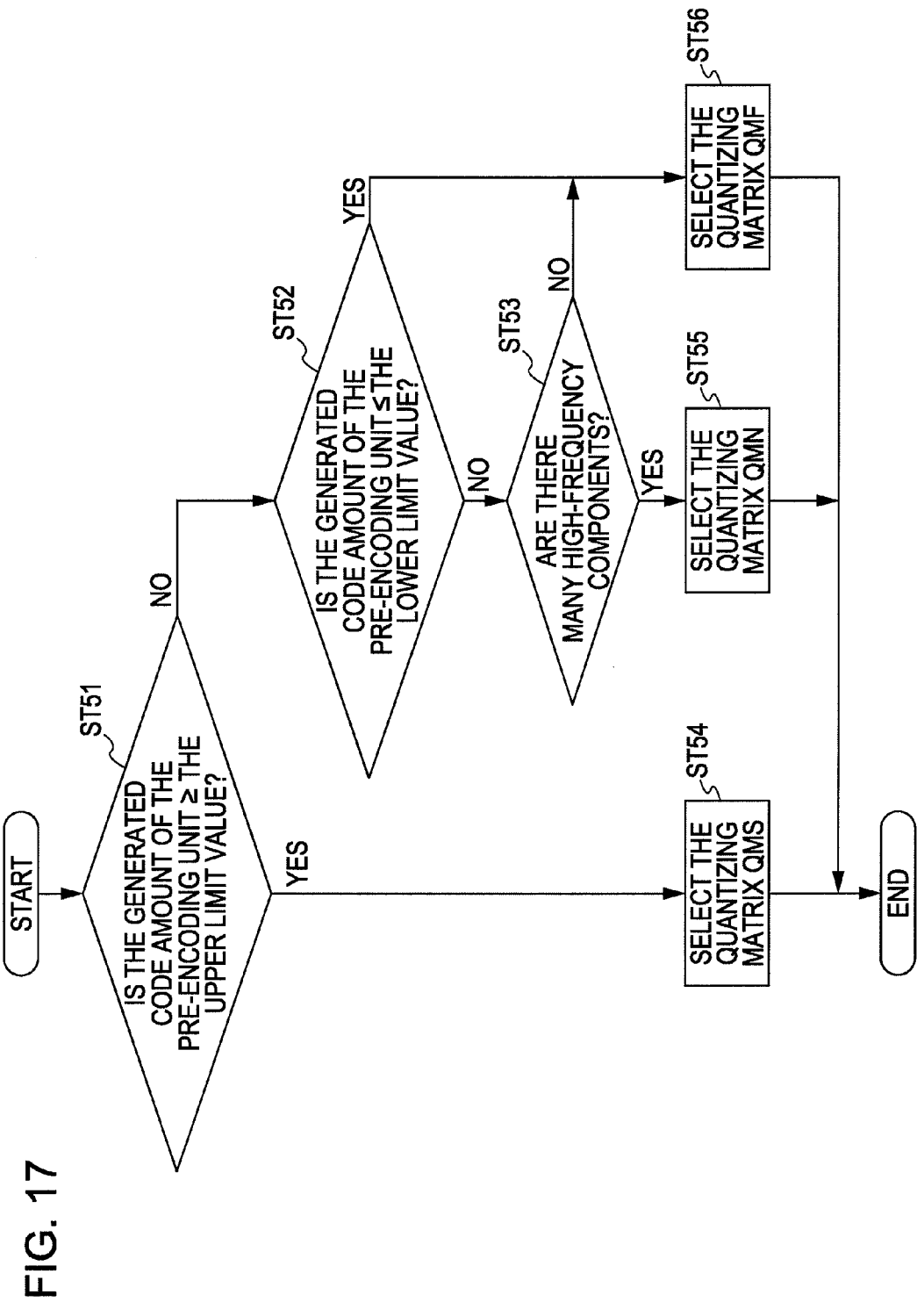
FIG. 17 is a flowchart illustrating quantizing matrix selection operation.

In step ST42, the code amount control unit 40*a* performs quantizing matrix selecting operation. FIG. 17 is a flowchart illustrating the quantizing matrix selecting operation. In step ST51, the code amount control unit 40*a* distinguishes whether or not the generated code amount of the pre-encoding unit 20 is equal to or greater than an upper limit value. When the generated code amount is less than the upper limit value, the code amount control unit 40*a* proceeds to step ST52, and when the generated code amount is equal to or greater than the upper limit value, proceeds to step ST54.

In step ST52, the code amount control unit 40*a* distinguishes whether or not the generated code amount of the pre-encoding unit 20 is equal to or smaller than a lower limit value. When the generated code amount is greater than the lower limit value, the code amount control unit 40*a* proceeds to step ST53, and when the generated code amount is equal to or smaller than the lower limit value, proceeds to step ST56.

In step ST53, the code amount control unit 40*a* distinguishes whether or not there are many high-frequency components. The code amount control unit 40*a* calculates an identification value whereby determination can be made from the generated code amount of the intra pre-encoding unit 30 whether or not there are many high-frequency components. The code amount control unit 40*a* calculates the percentage of the generated code amount at the time of employing the quantizing matrix QMN as to the generated code amount at the time of employing the quantizing matrix QMF, and takes this as the identification value. In the event of determining that the calculated identification value is greater than a threshold THva, and there are many high-frequency components, the code amount control unit 40*a* proceeds to step ST55, and in the event of determining that the calculated identification value is equal to or smaller than the threshold THva, and there are a few high-frequency components, proceeds to step ST56.

In step ST54, the code amount control unit 40*a* selects the quantizing matrix QMS. As the generated code amount of the pre-encoding unit 20 is equal to or greater than the upper limit value, the code amount control unit 40*a* selects the quantizing matrix QMS illustrated in FIG. 13C. In the event of thus selecting the quantizing matrix QMS, the high-frequency components are greatly reduced, and the generated code amount becomes small.

In step ST55, the code amount control unit 40*a* selects the quantizing matrix QMN. As the generated code amount of the pre-encoding unit 20 is included in a range between the upper limit value and the lower limit value, and high-frequency components are not determined to be small, the code amount control unit 40*a* selects the quantizing matrix QMN illustrated in FIG. 13B that is commonly employed.

In step ST56, the code amount control unit 40*a* selects the quantizing matrix QMF. As the generated code amount of the pre-encoding unit 20 is equal to or smaller than the lower limit value, or the generated code amount is included in a range between the upper limit value and the lower limit value, but high-frequency components are determined to be small, the code amount control unit 40*a* selects the quantizing matrix QMF illustrated in FIG. 13A. In the event of thus selecting the quantizing matrix QMF, low-frequency components and high-frequency components can be prevented from being reduced.

Thus, the code amount control unit 40*a* selects the quantizing matrix QMN for reducing high-frequency components at the time of determining that there are many high-frequency components, and selects the quantizing matrix QMF of which the reduction of high-frequency components is smaller than that of the quantizing matrix QMN at the time of determining that there are a few high-frequency components. Accordingly, for example, encoding using the quantizing matrix for reducing high-frequency components is not performed as to an image of which the high-frequency components have already been reduced through encoding and decoding processing, and accordingly, image quality thereof can be prevented from deteriorating. Also, when the generated code amount calculated at the pre-encoding unit 20 is equal to or greater than the upper limit value, the quantizing matrix QMS of which the reduction of high-frequency components is greater than the quantizing matrix QMN is selected, and accordingly, the quantizing matrix for reducing the generated code amount can be selected.

Note that, with the quantizing matrix selecting operation illustrated in FIG. 17, the quantizing matrix is selected according to the generated code amount, but selection of the quantizing matrix may be performed according to the value of the quantizing parameter QP(t) calculated in step ST41 in FIG. 16, according to the generated code amount. For example, when the value of the quantizing parameter QP(t) is smaller than a predetermined first parameter value in step ST51, the quantizing matrix QMS is selected in step ST54. Also, an arrangement may be made wherein when the value of the quantizing parameter QP(t) is greater than a predetermined second parameter value (a value greater than the first value) in step ST51, the quantizing matrix QMF is selected in step ST56.

The code amount control unit 40a performs quantization matrix setting operation in step ST42 in FIG. 16, and proceeds to step ST43.

In step ST43, the code amount control unit 40a performs quantizing matrix switching restriction processing. The code amount control unit 40a performs the quantizing matrix switching restriction processing so as to prevent image quality from becoming unstable, for example, by a different quantizing matrix being selected as to similar images within a GOP, and switching of quantizing matrices being frequently performed.

Figure 18:
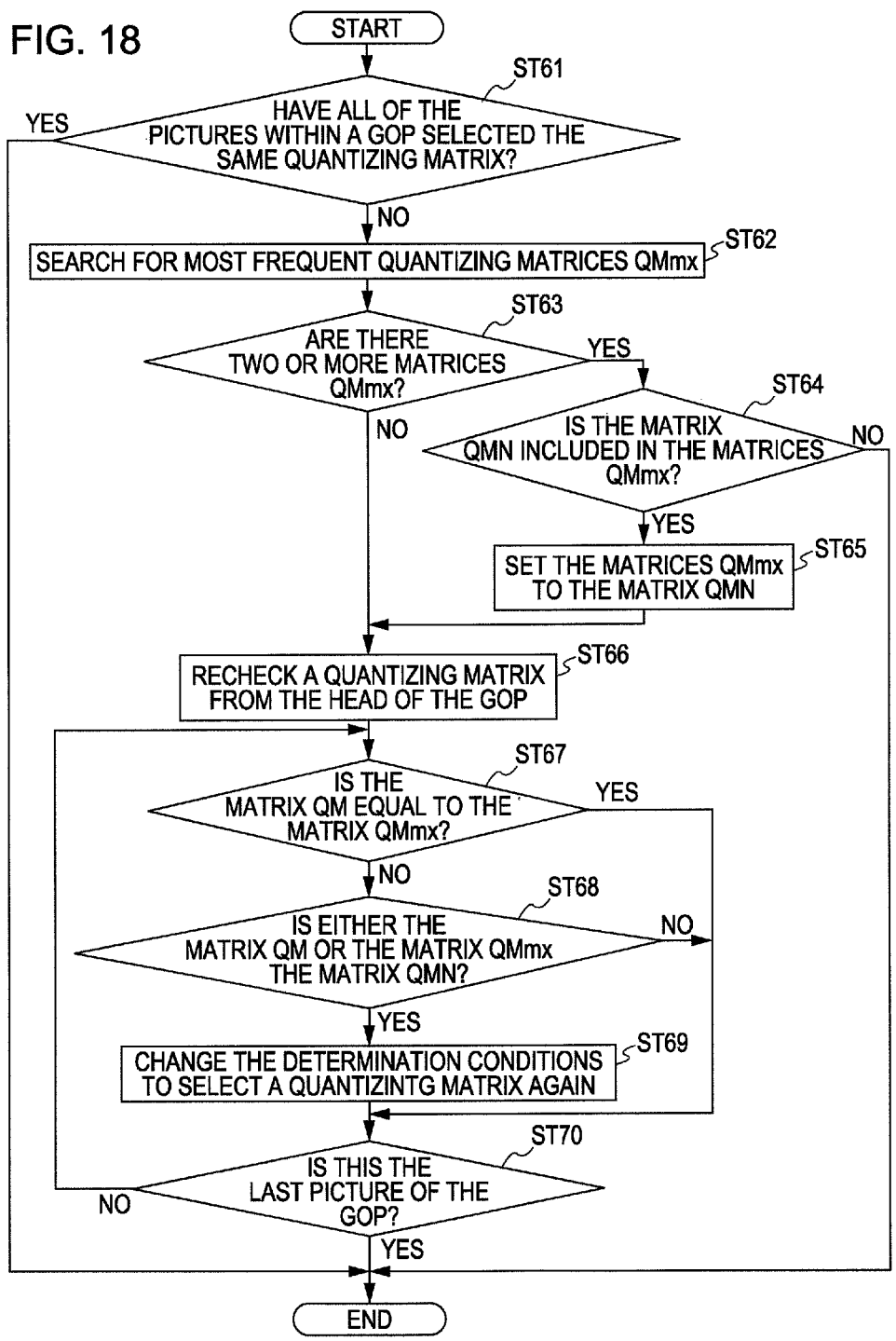
FIG. 18 is a flowchart illustrating quantizing matrix switching restriction processing.

FIG. 18 is a flowchart illustrating the quantizing matrix switching restriction processing. In step ST61, the code amount control unit 40a distinguishes whether or not all the pictures within a GOP have selected the same quantizing matrix. When all the pictures within a GOP do not select the same quantizing matrix, the code amount control unit 40a proceeds to step ST62. Also, when all the pictures within a GOP select the same quantizing matrix, the code amount control unit 40a ends the switching restriction processing.

In step ST62, the code amount control unit 40a searches for a most frequent quantizing matrix to be most frequently employed. The code amount control unit 40a takes a quantizing matrix to be most frequently employed within a GOP as a most frequent quantizing matrix QMmx, and proceeds to step ST63.

In step ST63, the code amount control unit 40a distinguishes whether or not there are two or more most frequent quantizing matrices QMmx. When there are two or more most frequent quantizing matrices QMmx, the code amount control unit 40a proceeds to step ST64, and when there is a single most frequent quantizing matrix QMmx, proceeds to step ST66.

In step ST64, the code amount control unit 40a distinguishes whether or not the quantizing matrix QMN is included in the most frequent quantizing matrices QMmx. When the quantizing matrix QMN is included in the most frequent quantizing matrices QMmx, the code amount control unit 40a proceeds to step ST65. Also, when the quantizing matrix QMN is not included in the most frequent quantizing matrices QMmx, i.e., in the event that the quantizing matrix QMF and the quantizing matrix QMS have been selected as the most frequent quantizing matrices QMmx, the code amount control unit 40a ends the stabilization control operation. In the event that the quantizing matrix QMF and the quantizing matrix QMS have been selected as the most frequent quantizing matrices QMmx, with a picture selecting the quantizing matrix QMF and a picture selecting the quantizing matrix QMS, estimation is made that the generated code amounts completely differ, and the images do not resemble each other. Accordingly, the stabilization control operation ends.

In step ST65, the code amount control unit 40a sets the quantizing matrix QMN to the most frequent quantizing matrices QMmx, and proceeds to step ST66.

In step ST66, the code amount control unit 40a performs recheck of the quantizing matrix from the head of the GOP, and proceeds to step ST67.

In step ST67, the code amount control unit 40a distinguishes whether or not the quantizing matrix QM is equal to the most frequent quantizing matrix QMmx. When the quantizing matrix QM of the picture is not equal to the most frequent quantizing matrix QMmx, the code amount control unit 40a proceeds step ST68, and when both are equal, proceeds to step ST70.

In step ST68, the code amount control unit 40a distinguishes whether or not either the quantizing matrix QM or the most frequent quantizing matrix QMmx is the quantizing matrix QMN. When either the quantizing matrix QM or the most frequent quantizing matrix QMmx is the quantizing matrix QMN, the code amount control unit 40a proceeds to step ST69. Also, when neither is the quantizing matrix QMN, the code amount control unit 40a proceeds to step ST70. That is to say, when one of the quantizing matrix QM and the most frequent quantizing matrix QMmx is the quantizing matrix QMF, and the other is the quantizing matrix QMS, as described above, the images are estimated to not resemble each other, and accordingly, the code amount control unit 40a proceeds to step ST70.

In step ST69, the code amount control unit 40a changes the determination conditions to perform reselection of the quantizing matrix. The code amount control unit 40a corrects the determination conditions so as to select the most frequent quantizing matrix in an image similar to the image from which the most frequent quantizing matrix has been selected, performs selection of the quantizing matrix again, and proceeds to step ST70. The code amount control unit 40a corrects the upper limit value employed in step ST51 in FIG. 17 or the threshold THva employed in step ST53 in a direction where the most frequent quantizing matrix is readily selected, performs selection of the quantizing matrix again, and proceeds to step ST70.

In step ST70, the code amount control unit 40a distinguishes whether or not the present picture is the final picture of the GOP. When the present picture is not the final picture, the code amount control unit 40a returns to step ST67, and at the time of the final picture of the GOP, ends the switching restriction processing.

In the event of thus performing the quantizing matrix switching restriction processing, with similar images within a GOP, the same quantizing matrix is selected, and accordingly, switching of quantizing matrices is reduced, and image quality can be stabilized.

In step ST44 in FIG. 16, the code amount control unit 40a performs calculation of a second generated code amount. The code amount control unit 40a detects the generated code amount BT(it) in the quantizing parameter QP(t) from the generated code amounts calculated at the intra pre-encoding unit 30, and takes this as a second generated code amount. Here, in the case that the quantizing matrix QMN is employed at the pre-encoding unit 20, the code amount control unit 40a detects the generated code amount BT(it) in the quantizing parameter QP(t) from the generated code amounts BT(i0N), BT(i1N), and BT(i2N) at the time of performing encoding using the quantizing parameters QP(i0) through QP(i2), and the quantizing matrix QMN, and takes this as the second generated code amount.

Figure 19:
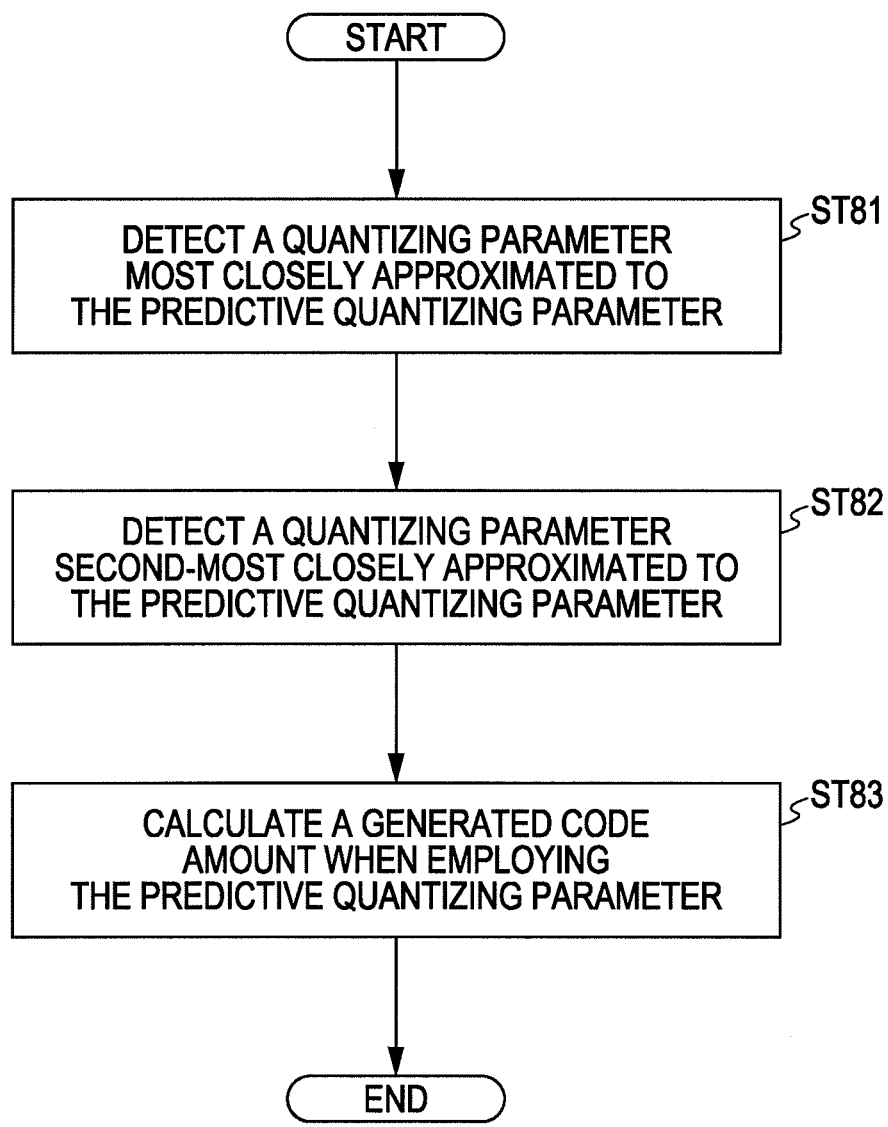
FIG. 19 is a flowchart illustrating second generated code detection processing.

FIG. 19 is a flowchart illustrating second generated code amount detection processing. In step ST81, the code amount control unit 40a detects a quantizing parameter most closely approximated to the predicted quantizing parameter from quantizing parameters employed in the intra pre-encoding processing. The code amount control unit 40a detects a quantizing parameter most closely approximated to the quantizing parameter QP(t) out of the quantizing parameters QP(i0) through QP(i2) for example, takes this as a quantizing parameter QP(ia), and proceeds to step ST82.

In step ST82, the code amount control unit 40a detects a quantizing parameter second-most closely approximated to the predicted quantizing parameter out of the quantizing parameters employed in the intra pre-encoding processing. The code amount control unit 40a detects a quantizing parameter second-most closely approximated to the quantizing parameter QP(t) out of the quantizing parameters QP(i0) through QP(i2) for example, takes this as a quantizing parameter QP(ib), and proceeds to step ST83.

In step ST83, the code amount control unit 40a calculates a generated code amount at the time of employing the predicted quantizing parameter. The code amount control unit 40a uses the generated code amount BT(iaN) at the time of employing the quantizing parameter QP(ia) and the quantizing matrix QMN, and the generated code amount BT(ibN) at the time of employing the quantizing parameter QP(ib) and the quantizing matrix QMN to perform interpolation processing. The code amount control unit 40a performs linear interpolation, curve interpolation, or the like as the interpolation processing to calculate the generated code amount BT(it) of the predicted quantizing parameter QP(t).

The code amount control unit 40a thus calculates the second generated code amount BT(it), and proceeds from step ST44 to step ST45 in FIG. 16.

In step ST45, the code amount control unit 40a calculates a first correction coefficient. The code amount control unit 40a uses the first generated code amount BT(pt) detected from the pre-encoding processing results, and the second generated code amount BT(it) detected from the intra pre-encoding processing results to perform the calculation of Expression (2) to calculate a first correction coefficient C(i), and proceeds to step ST46.

$$C(i)=BT(it)/BT(pt) \quad (2)$$

In step ST46, the code amount control unit 40a calculates high-frequency component cost. The code amount control unit 40a calculates high-frequency component cost H(i) indicating the state of a high-frequency component in an I picture.

Figure 20:
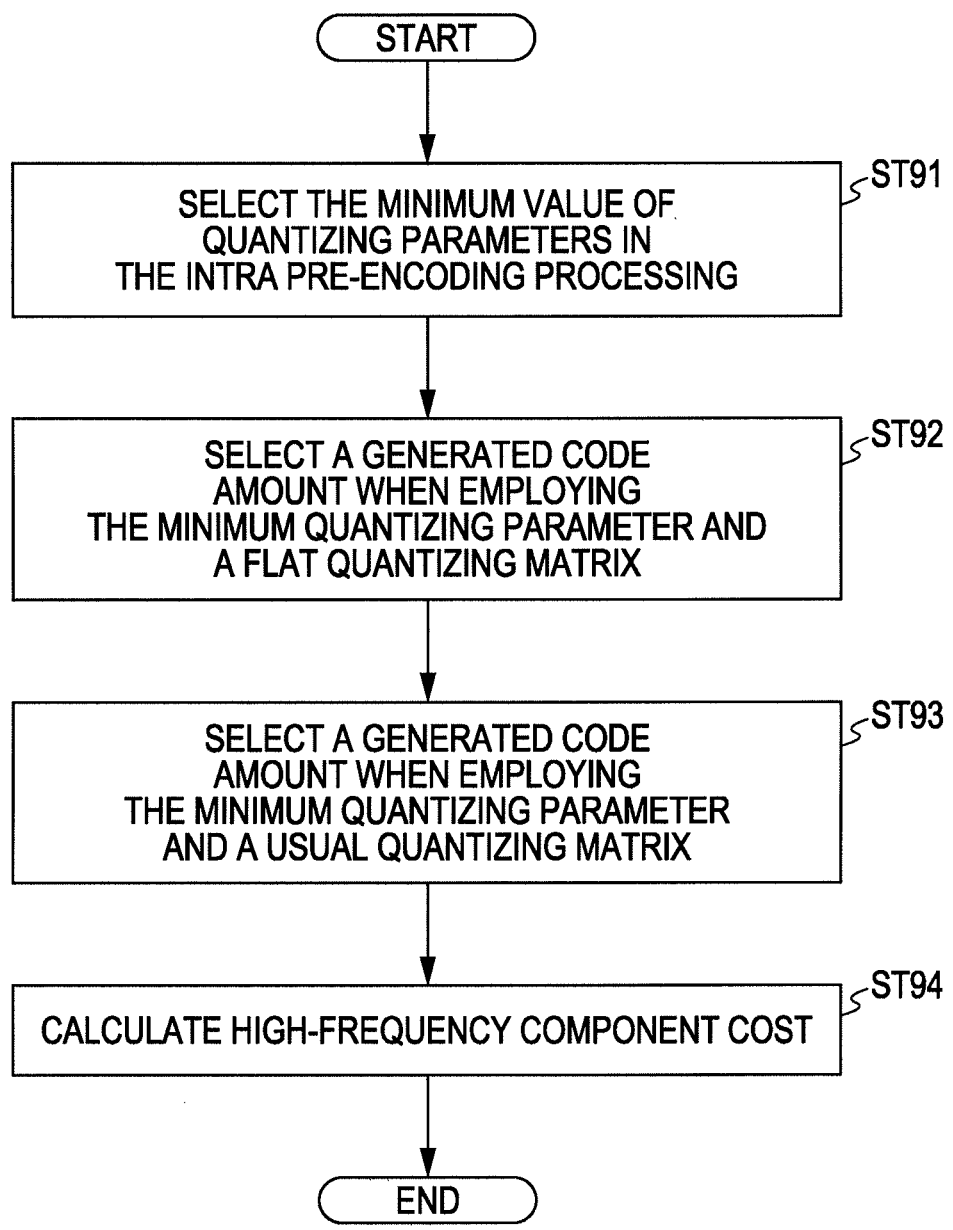
FIG. 20 is a flowchart illustrating high-frequency component cost calculating operation.
Figure 21:
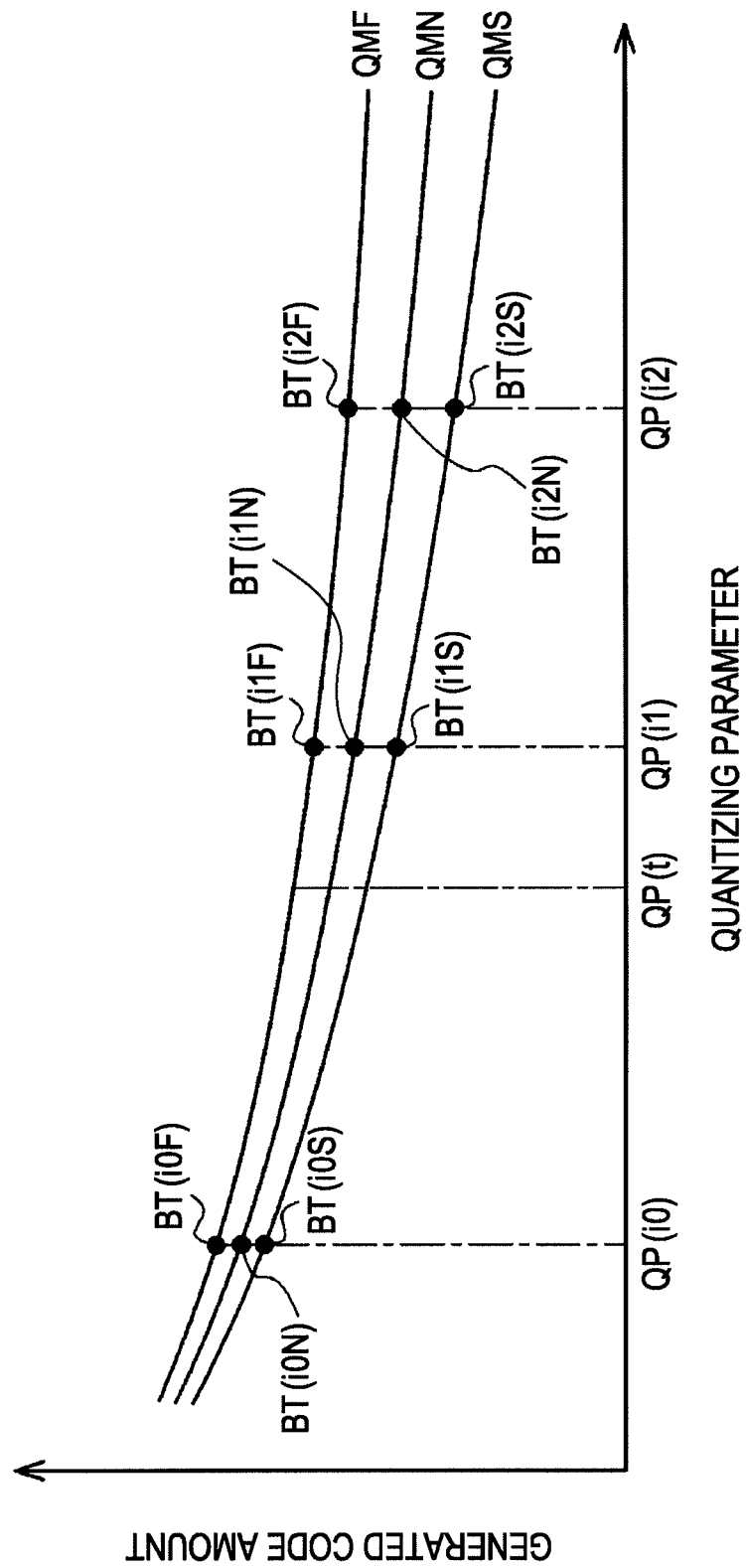
FIG. 21 is a diagram for describing processing for calculating a quantizing parameter and a generated code amount.

FIG. 20 is a flowchart illustrating high-frequency component cost calculating operation. Also, FIG. 21 illustrates output from the intra pre-encoding unit.

In FIG. 20, in step ST91 the code amount control unit 40a selects the minimum value of the quantizing parameters in the intra pre-encoding processing. For example, such as illustrated in FIG. 21, with the intra pre-encoding processing, in the event that quantizing parameters QP(i0), QP(i1), and QP(i2) (QP(i0)<QP(i1)<QP(i2)) are employed, the code amount control unit 40a selects the quantizing parameter QP(i0), and proceeds to step ST92.

In step ST92, the code amount control unit 40a selects a generated code amount when employing the smallest quantizing parameter, and a quantizing matrix of which the quantizing steps from a high frequency to a low frequency are flat. For example, the quantizing matrix QMF will be a matrix of which the matrix values are fixed values, and the quantizing steps from a high frequency to a low frequency are flat. The quantizing matrix QMN will be a matrix wherein the matrix value of a high frequency is a value greater than that of a low frequency, and a high frequency is roughly quantized as compared to a low frequency. The quantizing matrix QMN will be a matrix wherein the matrix value of a high frequency is a value greater than that of a low frequency, and a high frequency is roughly quantized as compared to a low frequency. The quantizing matrix QMS will be a matrix wherein the matrix value of a high frequency is a further great value as compared to the quantizing matrix QMN, and quantization is performed in a state in which the attenuation of a high frequency is steep as compared to the quantizing matrix QMN. In this case, as the quantizing parameter QP(i0) is selected as the smallest quantizing parameter, the code amount control unit 40a selects the generated code amount BT(i0F) at the time of employing the quantizing parameter QP(i0) and the quantizing matrix QMF, and proceeds to the step ST93.

In step ST93, the code amount control unit 40a selects a generated code amount at the time of employing the smallest quantizing parameter, and a common quantizing matrix for roughly quantizing a high frequency as compared to a low frequency. For example, the code amount control unit 40a selects the generated code amount BT(i0N) at the time of employing the quantizing parameter QP(i0) and the quantizing matrix QMN, and proceeds to step ST94.

In step ST94, the code amount control unit 40a calculates high-frequency component cost. The code amount control unit 40a performs the calculation of Expression (3) to calculate high-frequency component cost H(i).

$$H(i)=BT(i0F)/BT(i0N) \quad (3)$$

When thus calculating high-frequency cost, the code amount control unit 40a proceeds from step ST46 to step ST47 in FIG. 16, and performs the calculation of a second correction coefficient. The second correction coefficient is a correction coefficient for correcting the predicted generated code amount to a generated code amount at the time of employing the quantizing matrix used at the main encoding unit 70. Note that the quantizing matrix used at the main encoding unit 70 is a quantizing matrix selected for each picture in steps ST42 and ST43, and will be taken as a quantizing matrix QMW in the following description.

Figure 22:
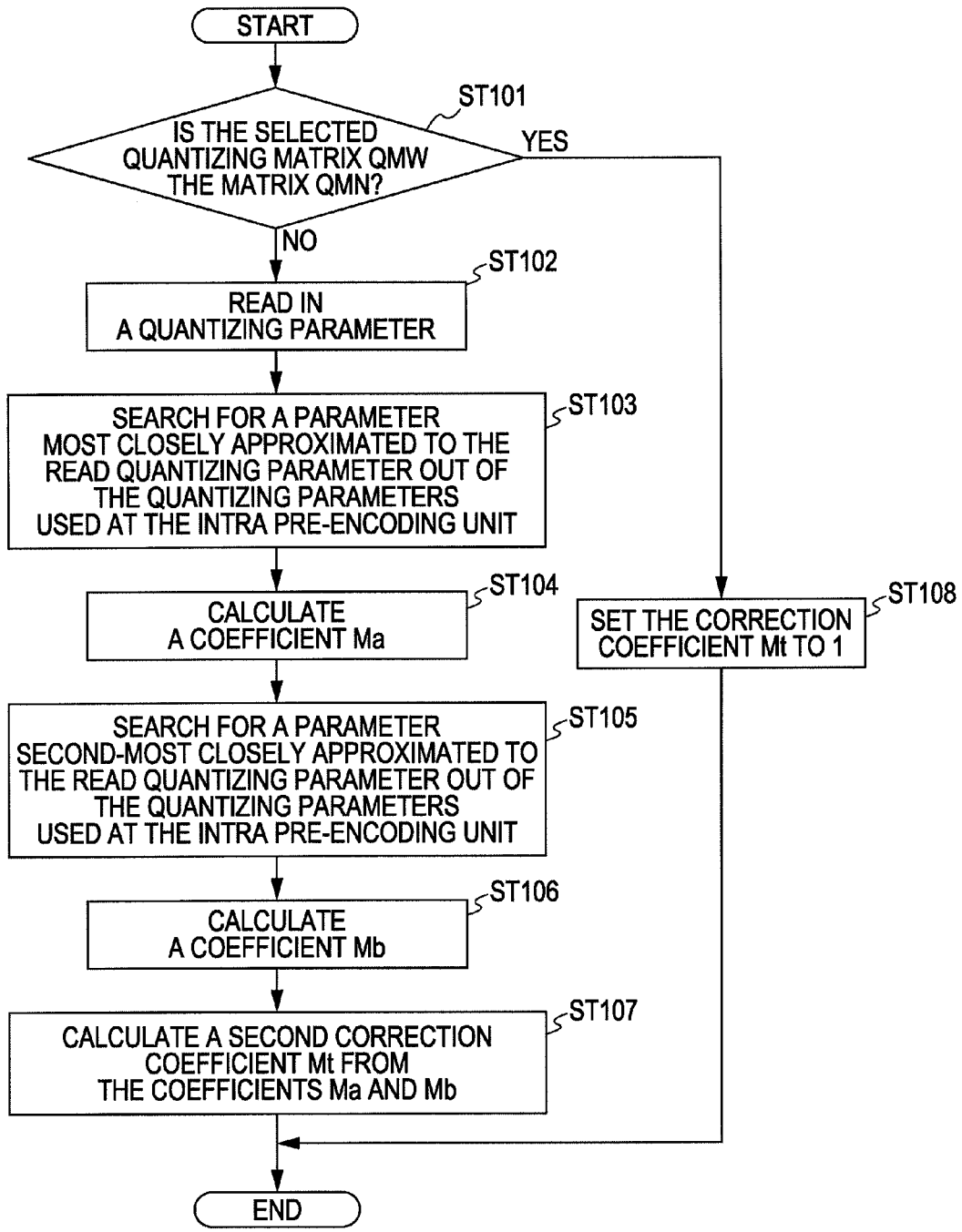
FIG. 22 is a flowchart illustrating second correction coefficient calculating operation.

FIG. 22 is a flowchart illustrating second correction coefficient calculating operation. In step ST101, the code amount control unit 40a distinguishes whether or not the selected matrix QMW is the quantizing matrix QMN. When the selected quantizing matrix QMW is not the quantizing matrix QMN, the code amount control unit 40a proceeds to step ST102, and when the selected quantizing matrix QMW is the quantizing matrix QMN, proceeds to step ST108.

In step ST102, the code amount control unit 40a performs reading of the quantizing parameter. The code amount control unit 40a reads in the quantizing parameter QP(t) predicted in step ST41, and proceeds to step ST103.

In step ST103, the code amount control unit 40a selects a quantizing parameter most closely approximated to the quantizing parameter used at the intra pre-encoding unit 30. The code amount control unit 40a selects, for example, a parameter most closely approximated to the quantizing parameter QP(t) out of the quantizing parameters QP(i0) through QP(i2), takes this as a quantizing parameter QP(ia), and proceeds to step ST104.

In step ST104, the code amount control unit 40a calculates a coefficient Ma in the quantizing parameter QP(ia). The code amount control unit 40a takes a generated code amount at the time of employing the quantizing matrix QMN in the quantizing parameter QP(ia) as BT(iaN). Also, with the quantizing parameter QP(ia), a generated code amount at the time of employing the quantizing parameter QMM selected in the quantizing matrix selecting operation is taken as BT(iaM). The code amount control unit 40a uses Expression (4) to calculate the coefficient Ma, and proceeds to step ST105.

$$Ma=BT(iaN)/BT(iaM) \quad (4)$$

In step ST105, the code amount control unit 40a selects a quantizing parameter second-most closely approximated to the quantizing parameter used at the intra pre-encoding unit 30. The code amount control unit 40a selects, for example, a parameter second-most closely approximated to the quantizing parameter QP(t) out of the quantizing parameters QP(i0) through QP(i2), takes this as a quantizing parameter QP(ib), and proceeds to step ST106.

In step ST106, the code amount control unit 40a calculates a coefficient Mb in the quantizing parameter QP(ib). The code amount control unit 40a takes a generated code amount at the time of employing the quantizing matrix QMN in the quantizing parameter QP(ib) as BT(ibN). Also, with the quantizing parameter QP(ib), a generated code amount at the time of employing the quantizing parameter QMM selected in the quantizing matrix selecting operation is taken as BT(ibM). The code amount control unit 40a uses Expression (5) to calculate the coefficient Mb, and proceeds to step ST107.

$$Mb=BT(ibN)/BT(ibM) \quad (5)$$

In step ST107, the code amount control unit 40a calculates a second correction coefficient Mt as to the quantizing parameter QP(t) from the coefficients Ma and Bb. The code amount control unit 40a performs interpolation processing, e.g., linear interpolation shown in Expression (6) using the coefficient Ma and the coefficient Mb to calculate the second correction coefficient Mt.

$$Mt=Ma+(Mb-Ma)\times(QP(t)-QP(ia))/(QP(ib)-QP(ia)) \quad (6)$$

In step ST108, the code amount control unit 40a takes the second correction coefficient Mt as "1". As the quantizing matrix used at the pre-encoding unit 20, and the quantizing matrix used at the main encoding unit 70 are both the quantizing matrices QMN, the code amount control unit 40a takes the second correction coefficient Mt as "1", and ends the processing.

In the event of calculating the second correction coefficient in this way, for example, such as illustrated in FIG. 21, a parameter most closely approximated to the quantizing parameter QP(t) is the quantizing parameter QP(i1), and a parameter second-most closely approximated to the quantizing parameter QP(t) is the quantizing parameter QP(i0), and in the event that the quantizing matrix QMS has been selected, the second correction coefficient Mt can be calculated by performing the calculation of Expressions (4) through (6) with BT(iaN)=BT(i1N), BT(iaM)=BT(i1S), BT(ibN)=BT(i0N), BT(ibN)=BT(i0N), BT(ibM)=BT(i0S), QP(ia)=QP(i1), and QP(ib)=QP(i0).

In this way, after calculating the second coefficient in step ST47 in FIG. 16, the code amount control unit 40a proceeds to step ST48, and performs correction of the first generated code amount. The code amount control unit 40a performs the calculation of Expression (7) using the generated code amount BT(pt) and the correction coefficient C(i) to calculate a corrected generated code amount BT(itc).

$$BT(itc)=BT(pt)\times C(i)\times Mt \quad (7)$$

Figure 23:
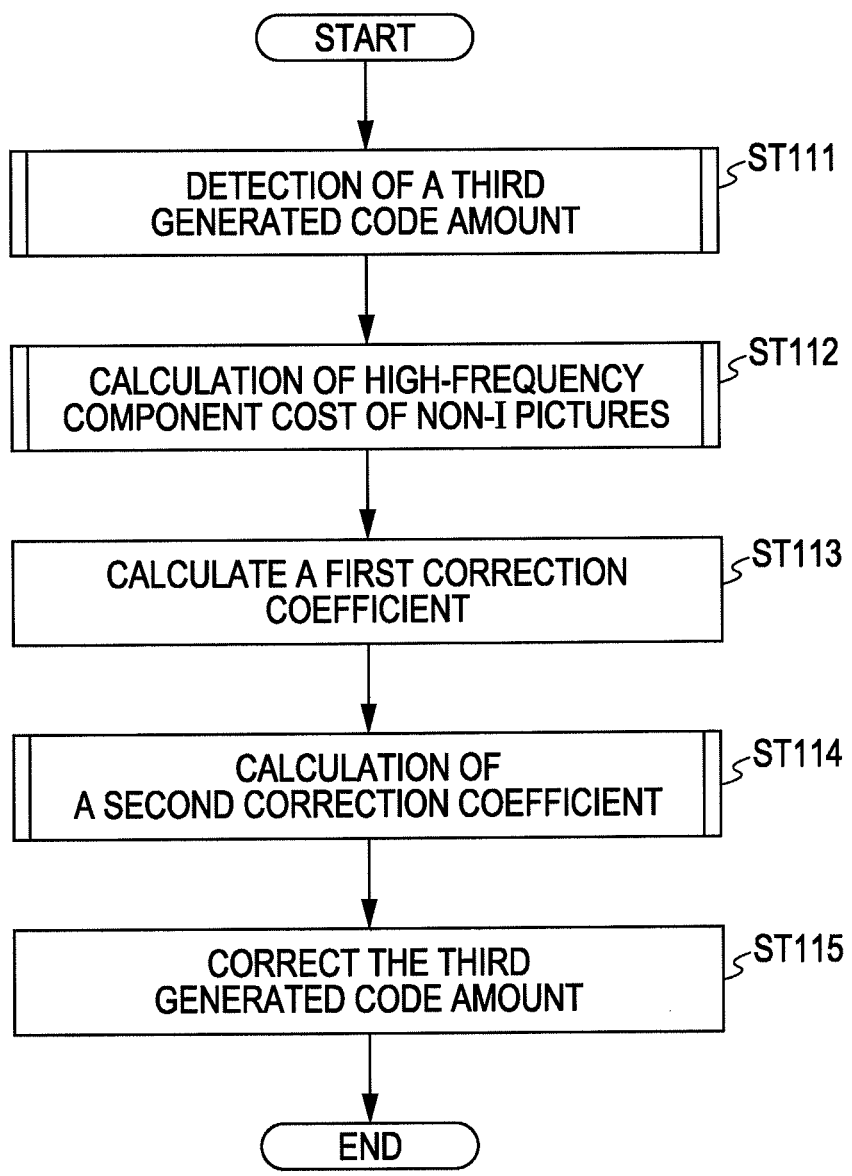
FIG. 23 is a flowchart illustrating generated code amount calculation processing for non-I pictures.

Next, description will be made regarding non-I picture generated code amount calculation processing at the time of employing the predicted quantizing parameter using the flowchart illustrated in FIG. 23. In step ST111, the code amount control unit 40a performs detection of a third generated code amount. The code amount control unit 40a classifies macro blocks into groups according to the generated code amount BT(p) at the time of performing encoding using the fixed quantizing parameter QP(p) at the pre-encoding unit 20. Also, the code amount control unit 40a selects a predictive curve of the corresponding group from multiple predictive curves indicating relationship between a quantizing parameter and a generated code amount provided for each group beforehand. Further, the code amount control unit 40a takes already predicted generated code amount BT(ut) in the quantizing parameter QP(t) using the selected predictive curve as the third generated code amount, and proceeds to step ST112.

In step ST112, the code amount control unit 40a calculates high-frequency component cost in a non-I picture. The code amount control unit 40a performs the same processing as the high-frequency component cost calculation shown in the above FIG. 12 to calculate high-frequency cost H(u) in a non-I picture. In this case, calculation of the high-frequency component H(u) is performed using Expression (8).

$$H(u)=BT(i0F)/BT(i0N) \quad (8)$$

Note that, in Expression (8), the generated code amounts BT(i0F) and BT(i0N) are generated code amounts at the time of subjecting the image data of a non-I picture for calculating high-frequency component cost to the intra pre-encoding processing as an I picture.

In this way, after calculating high-frequency cost in step ST112, the code amount control unit 40a proceeds to step ST113 to calculate a first correction coefficient. The code amount control unit 40a performs the calculation of Expression (9) using the correction coefficient C(i) and the high-frequency component cost H(i) calculated in the I picture, and the high-frequency component cost H(u) calculated in step ST112 to calculate a correction coefficient C(ic), and proceeds to step ST114.

$$C(ic)=C(i)\times H(i)/H(u) \quad (9)$$

In step ST114, the code amount control unit 40a performs second correction coefficient calculating operation. The code amount control unit 40a performs the second correction coefficient described with reference to FIG. 22 to calculate a second correction coefficient Mtu corresponding to a non-I picture from the generated code amount calculated in an I picture of the intra pre-encoding unit 30 corresponding to a non-I picture, and proceeds to step ST115.

In step ST115, the code amount control unit 40a performs correction of a third generated code amount. The code amount control unit 40a performs the calculation of Expression (10) using the generated code amount BT(ut) and the correction coefficients C(ic) and Mtu to calculate a corrected generated code amount BT(utc). Note that the correction coefficient Mtu is a correction coefficient calculated in the same way as with an I picture using the generated code amount of a non-I picture.

$$BT(utc)=BT(ut)\times C(ic)\times Mtu \quad (10)$$

In this way, the code amount control unit 40a performs correction of the generated code amount of a non-I picture. Further, the code amount control unit 40a determines a quantizing parameter wherein the total of generated code amounts after correction of 1 GOP is equal to or smaller than the target generated code amount and most closely approximated to the target generated code amount. The main encoding unit 70 performs encoding of the image data using the quantizing parameter and the quantizing matrix determined at the code amount control unit 40a, and outputs the encoded data.

In the event of performing the above operation using the second embodiment, setting of the accurate quantization information can be performed by the pre-encoding processing and the intra pre-encoding processing. Accordingly, this set quantization information is taken as a reference, whereby a range for performing distinction of quantization information used for the last encoding can optimally be set.

Also, when the image data of a raw image not subjected to encoding is input, encoding is performed at the main encoding unit using the quantizing parameter and the quantizing matrix set at the code amount control unit 40a. Therefore, the encoded data can be output wherein the generated code amount is equal to or smaller than the target generated code amount and also there is little deterioration in the image. Also, a quantizing matrix is selected from the multiple different quantizing matrices based on the distinction results of high-frequency components using the generated code amount calculated at the pre-encoding unit 20, and the generated code amount calculated at the intra pre-encoding unit 30. Therefore, deterioration in image quality can further be reduced as compared to a case where the target generated code amount is realized by the quantizing parameter alone.

Also, the generated code amount predicted by performing the pre-encoding processing using the quantizing parameter for realizing the target generated code amount is corrected according to the generated code amount calculated by performing the intra pre-encoding processing. Further, the quantizing parameter is determined so that the generated code amount after correction realizes the target generated code amount. Therefore, even in the case that relationship between the generated code amount and the quantizing parameter of a macro block is changed according to an image, prediction of a generated code amount can accurately be performed.

Also, a series of processing described in the present Specification may be executed by hardware, software, or a combined configuration of both. In the case of executing processing by software, a program in which processing sequence is recorded may be executed by being installed in memory within a computer housed in dedicated hardware, or may be executed by being installed in a general-purpose computer capable of executing various types of processing.

For example, the program may be recorded beforehand in a hard disk or ROM (Read Only Memory) serving as a recording medium, or may be temporarily or eternally stored (recorded) in a removable medium such as a flexible disk, CD-ROM (Compact Disc Read Only Memory), MO (Magneto Optical) disk, DVD (Digital Versatile Disc), a magnetic disk, semiconductor memory, or the like. Such a removable medium may be provided as so-called packaged software.

Note that the program may be transferred from a download site to a computer wirelessly, or by cable via a network such as a LAN (Local Area Network), the Internet, or the like in addition to being installed in a computer from a removable recording medium such as described above. The computer can receive the program thus transferred so as to be installed in a recording medium such as a built-in hard disk or the like.

The present application contains subject matter related to that disclosed in Japanese Priority Patent Application JP 2009-173907 filed in the Japan Patent Office on Jul. 27, 2009, the entire content of which is hereby incorporated by reference.

Note that the present invention is not be interpreted in a manner restricted to the above embodiments of the invention. With the embodiments of the present invention, the present invention has been disclosed in an exemplification mode, and it is apparent that one skilled in the art can conceive various modifications or alternations without departing from the essence and spirit of the present invention. That is to say, in order to understand the essence and spirit of the present invention, the Claims should be referred to.

What is claimed is:

1. An image encoding device comprising:
    a first encoding unit configured to calculate a generated code amount by performing encoding of image data in increments of GOP (Group of Picture) including a reference picture and a non-reference picture in a predetermined order using predetermined quantization information;
    a code amount control unit configured to perform setting of quantization information for realizing a target generated code amount based on the generated code amount calculated at said first encoding unit;
    a quantization information distinguishing unit configured to perform calculation of a DCT (Discrete Cosine Transform) coefficient with the image of each frame of said image data as an I picture (intra encoded image) that is a reference picture, and to distinguish quantization information that minimizes the summation in increments of pictures of remainders at the time of performing division of said DCT coefficient using the quantization information in a range with the quantization information determined by said code amount control unit as a reference, as quantization information used at the time of performing last encoding;
    a picture-type setting unit configured to perform the setting of a picture type as to said image data in increments of said GOP, and in the case of this set picture type is different from a picture type of a picture of which the quantization information has been distinguished at said quantization information distinguishing unit, to match the picture type by setting a length of a subsequent GOP by eliminating non-reference pictures prior to the I picture and subsequent to the picture of which the quantization information has been distinguished;
    a second encoding unit configured to perform encoding of said image data based on the picture type set at said picture-type setting unit using said quantization information set at said code amount control unit, said quantization information including a quantizing matrix which is selected from a plurality of quantizing matrices based on distinction results of high-frequency components using the generated code amount calculated at the first encoding unit, and a generated code amount calculated at a third encoding unit,
    wherein the third encoding unit calculates the generated code amount by performing encoding for each of said quantization information with the image of each frame of said image data as an I picture using a plurality of different quantization information.

2. The image encoding device according to claim 1, wherein said picture-type setting unit adjusts the length of GOP to match a picture type to be set to said image data, and a picture type at the time of performing the last encoding.

3. The image encoding device according to claim 2, wherein said picture-type setting unit performs, at the time of the I picture distinguished at said quantization information distinguishing unit of which phase delays compared to the I picture to be set to said image data, adjustment of the length of GOP by reducing the number of pictures of the next single or plurality of GOPs to match the picture types of a reference picture and a non-reference picture to be set to said image data, and a picture type at the time of performing the last encoding.

4. The image encoding device according to claim 2, wherein said picture-type setting unit matches an I picture to be set to said image data, and an I picture at the time of performing the last encoding.

5. The image encoding device according to claim 1, further comprising:
    quantization information determining unit configured to change, at the time of said quantization information being distinguished at said quantization information distinguishing unit, the quantization information set at said code amount control unit to the quantization information distinguished as said quantization information distinguishing unit;

wherein said second encoding unit performs encoding of said image data using the quantization information determined at said quantization information determining unit.

6. The image encoding device according to claim 1, further comprising:

wherein said code amount control unit performs prediction of quantization information that realizes a target generated code amount, and a generated code amount at the time of using this quantization information based on the generated code amount calculated at said first encoding unit, corrects the predicted generated code amount according to the generated code amount calculated at said third encoding unit, and performs setting of quantization information such that the generated code amount after correction realizes said target generated code amount.

7. An image encoding method comprising the steps of:

calculating, with a first encoding unit, of a generated code amount by performing encoding of image data in increments of GOP (Group of Picture) including a reference picture and a non-reference picture in a predetermined order using predetermined quantization information;

setting, with a code amount control unit, of quantization information for realizing a target generated code amount based on the generated code amount calculated at said first encoding unit;

calculating, with a quantization information distinguishing unit, of a DCT (Discrete Cosine Transform) coefficient with the image of each frame of said image data as an I picture (Intra encoded image) that is a reference picture, and distinguishing of quantization information that minimizes the summation in increments of pictures of remainders at the time of performing division of said DCT coefficient using the quantization information in a range with the quantization information determined by said code amount control unit as a reference, as quantization information used at the time of performing last encoding;

setting, with a picture-type setting unit, of a picture type as to said image data in increments of said GOP, and in the case of this set picture type is different from a picture type of a picture of which quantization information has been distinguished at said quantization information distinguishing unit, matching the picture type by setting a length of a subsequent GOP by eliminating non-reference pictures prior to the I picture and subsequent to the picture of which the quantization information has been distinguished; and encoding, with a second encoding unit, of said image data based on the picture type set at said picture-type setting unit using said quantization information set at said code amount control unit, said quantization information including a quantizing matrix which is selected from a plurality of quantizing matrices based on distinction results of high-frequency components using the generated code amount calculated at the first encoding unit, and a generated code amount calculated at a third encoding unit, wherein the third encoding unit calculates the generated code amount by performing encoding for each of said quantization information with the image of each frame of said image data as an I picture using a plurality of different quantization information.

* * * * *